United States Patent
Jayarao et al.

(10) Patent No.: US 11,960,842 B2
(45) Date of Patent: *Apr. 16, 2024

(54) METHODS AND APPARATUS FOR NATURAL LANGUAGE UNDERSTANDING IN CONVERSATIONAL SYSTEMS USING MACHINE LEARNING PROCESSES

(71) Applicant: Walmart Apollo, LLC, Bentonville, AR (US)

(72) Inventors: Pratik Sridatt Jayarao, Pittsburgh, PA (US); Arpit Sharma, Santa Clara, CA (US); Deepa Mohan, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 27 days.

This patent is subject to a terminal disclaimer.

(21) Appl. No.: 17/187,762

(22) Filed: Feb. 27, 2021

(65) Prior Publication Data
US 2022/0277143 A1    Sep. 1, 2022

(51) Int. Cl.
*G06F 40/295*    (2020.01)
*G06F 40/211*    (2020.01)
(Continued)

(52) U.S. Cl.
CPC .......... *G06F 40/295* (2020.01); *G06F 40/211* (2020.01); *G06F 40/284* (2020.01);
(Continued)

(58) Field of Classification Search
CPC .... G06F 40/295; G06F 40/211; G06F 40/284; G06F 40/56; G06F 40/30; G06N 3/04; G06N 20/00
See application file for complete search history.

(56) References Cited

U.S. PATENT DOCUMENTS

| | | |
|---|---|---|
| 7,092,871 B2 | 8/2006 | Pentheroudakis et al. |
| 8,620,836 B2 | 12/2013 | Ghani et al. |

(Continued)

FOREIGN PATENT DOCUMENTS

| | | | |
|---|---|---|---|
| CN | 111640425 A | 9/2019 | |
| CN | 111640425 A | * 9/2020 | .............. G06F 3/011 |
| CN | 112613326 B | 11/2022 | |

OTHER PUBLICATIONS

Liu, Q., Kusner, M. J., & Blunsom, P. (2020). A survey on contextual embeddings. arXiv preprint arXiv:2003.07278. (Year: 2020).*

(Continued)

*Primary Examiner* — Michelle M Koeth
*Assistant Examiner* — Philip H Lam
(74) *Attorney, Agent, or Firm* — Morgan, Lewis & Bockius LLP; Manita Rawat

(57) ABSTRACT

This application relates to apparatus and methods for natural language understanding in conversational systems using machine learning processes. In some examples, a computing device receives a request that identifies textual data. The computing device applies a natural language model to the textual data to generate first embeddings. In some examples, the natural language model is trained on retail data, such as item descriptions and chat session data. The computing device also applies a dependency based model to the textual data to generate second embeddings. Further, the computing device concatenates the first and second embeddings, and applies an intent and entity classifier to the concatenated embeddings to determine entities, and an intent, for the request. The computing device may generate a response to the request based on the determined intent and entities.

18 Claims, 15 Drawing Sheets

(51) Int. Cl.
G06F 40/284 (2020.01)
G06F 40/56 (2020.01)
G06N 3/04 (2023.01)
G06N 20/00 (2019.01)

(52) U.S. Cl.
CPC .............. *G06F 40/56* (2020.01); *G06N 3/04* (2013.01); *G06N 20/00* (2019.01)

(56) References Cited

U.S. PATENT DOCUMENTS

| | | | | |
|---|---|---|---|---|
| 2018/0232438 | A1* | 8/2018 | Gu | G06F 16/338 |
| 2020/0050949 | A1* | 2/2020 | Sundararaman | G06F 40/284 |
| 2020/0311198 | A1* | 10/2020 | Poon | G06N 3/08 |
| 2020/0388396 | A1 | 12/2020 | Lindvall | |
| 2020/0410337 | A1 | 12/2020 | Huang et al. | |
| 2021/0117623 | A1 | 4/2021 | Aly et al. | |
| 2021/0133535 | A1* | 5/2021 | Zhao | G06N 3/0445 |
| 2021/0142181 | A1* | 5/2021 | Liu | G06N 3/045 |
| 2022/0092267 | A1* | 3/2022 | Hou | G06F 40/279 |
| 2022/0129633 | A1* | 4/2022 | Shah | G06N 3/0454 |
| 2022/0164626 | A1* | 5/2022 | Bird | G06N 3/02 |
| 2022/0198327 | A1 | 6/2022 | Wang et al. | |
| 2022/0229993 | A1* | 7/2022 | Vu | G06F 40/40 |
| 2022/0237377 | A1 | 7/2022 | Zhang et al. | |

OTHER PUBLICATIONS

Sundararaman, D., Subramanian, V., Wang, G., Si, S., Shen, D., Wang, D., & Carin, L. (2019). Syntax-infused transformer and bert models for machine translation and natural language understanding. arXiv preprint arXiv:1911.06156 (Year: 2019).*

MacAvaney, S., & Zeldes, A. (2018). A deeper look into dependency-based word embeddings. arXiv preprint arXiv:1804.05972 ( Year: 2018).*

Jie, Z., & Lu, W. (2019). Dependency-guided LSTM-CRF for named entity recognition. arXiv preprint arXiv:1909.10148. (Year: 2019 ).*

Cui, R., Agrawal, G., & Ramnath, R. (2020). Tweets can tell: activity recognition using hybrid gated recurrent neural networks. Social Network Analysis and Mining, 10, 1-15. (Year: 2020).*

Zhu, X. (2020). Cross-lingual word sense disambiguation using mBERT embeddings with syntactic dependencies. arXiv preprint arXiv:2012.05300. (Year: 2020).*

"SpaCy 101: Everything you need to know", retrieved Feb. 29, 2020 via Wayback Machine, Explosion (Year: 2020).*

Tang, H., Ji, D., Li, C., & Zhou, Q. (Jul. 2010). Dependency graph enhanced dual-transformer structure for aspect-based sentiment classification. In Proceedings of the 58th annual meeting of the association for computational linguistics (pp. 6578-6588). (Year: 2020).*

Horey, Rani, "Bert: State of the Art NLP Model, Explained", found at <https://www.kdnuggets.com/2018/12/bert-sota-hlp-model-explained.html>, 2018, 8 pages.

Mukherjee, Snehasish et al., "Discriminative Pre-training for Low Resource Title Compression in Conversational Grocery", arXiv:2012.06943v1, Dec. 13, 2020, 7 pages.

Tanja Bunk, et al., "DIET: Lightweight Language Understanding for Dialogue Systems," May 11, 2020, 9 pages.

Google Research, "Use BERT fine-tuned model for Tensorflow serving," Nov. 19, 2018, 47 pages.

Nikola M. Zivkovic, "Deploying Machine Learning Models, pt. 3: gRPC and TensorFlow Serving," Rukiscode.net, Feb. 4, 2020, 17 pages.

SpaCy 101: Everything you need to know, retrieved Feb. 29, 2020 via Wayback Machine, Explosion (Year: 2020), 44 pages.

Z. Xingran, "Cross-lingual Word Sense Disambiguation using mBERT Embeddings with Syntactic Dependencies," arXiv:2012.05300v1 [cs.CL] Dec. 9, 2020, 9 pages.

* cited by examiner

METHODS AND APPARATUS FOR NATURAL LANGUAGE UNDERSTANDING IN CONVERSATIONAL SYSTEMS USING MACHINE LEARNING PROCESSES

TECHNICAL FIELD

The disclosure relates generally to conversational systems and, more specifically, to natural language understanding in conversational systems using machine learning processes.

BACKGROUND

In recent years, there has been technological advancements in Natural Language Processing (NLP) systems such as voice assistants, allowing them to be used in domains such as retail. These voice assistants can capture voice commands from customers, and can responds to the voice commands. Among other applications, voice assistants can assist customers navigate through various tasks such as customer support, item search, item purchase, and item tracking. For example, a voice assistant may translate captured voice into text, perform operations in accordance with the text, and respond with audio in accordance with the performed operations. For instance, a customer may speak a command to search for a type of item, such as a grocery item, at a retailer, and the voice assistant may perform a search of the retailer's website or portal to determine search results. The voice assistant may then translate the search results to audio in accordance with the search results, and may respond to the customer with the audio. Often times, however, the voice assistant may misinterpret an intended use or meaning of a command's word in a specific domain, such as in the retail space, versus in the general domain, causing discrepancies in the response to the command. Moreover, while customers have other options to communicate with a retailer, such as through the use of virtual assistants and chatbots, received queries may incur grammatical inconsistencies and other idiosyncrasies, causing discrepancies in any response received. As such, there are opportunities to improve natural language understanding in conversational systems.

SUMMARY

The embodiments described herein are directed to applying trained machine learning processes to textual data to more accurately determine one or more Natural Language Understanding (NLU) task outputs, such as for part-of-speech (POS) tagging, intent detection, named entity recognition (NER), title compression, and sentiment analysis. For example, the machine learning processes may operate on data characterizing a command spoken by a customer into a voice assistant, or data characterizing text provided by the customer, such as through a chat session, to determine an intent of the data. The machine learning processes may be employed by retailers in the retail space to provide a response to a customer's request, such as a request to search for an item, a request to determine if an item is in stock, or a request to purchase an item, for example.

The machine learning processes may employ a natural language model, such as a Bidirectional Encoder Representation from Transformers (BERT) model, which is trained on retail data. For example, the natural language model may be trained with item catalog data (e.g., item titles, item descriptions, etc.) and chat log data (e.g., data received from customers through chat interfaces), among other training data. Moreover, the machine learning processes may employ an embedding generation that injects dependency-based word embeddings to provide external syntactic context. Textual data may be provided to the natural language model and the embedding generation, and output data from each of the model is concatenated and provided to an intent and entity classifier to identify and tag (e.g., label) entities and determine an intent of the received textual data.

In accordance with various embodiments, exemplary systems may be implemented in any suitable hardware or hardware and software, such as in one or more suitable computing devices. For example, in some embodiments, a computing device (e.g., server) receives a request that identifies textual data. The computing device applies a natural language model to the textual data to generate first embeddings. In some examples, the natural language model is trained on retail data, such as item descriptions and chat session data. The computing device also applies a dependency based model to the textual data to generate second embeddings. Further, the computing device concatenates the first and second embeddings, and applies an intent and entity classifier to the concatenated embeddings to determine entities, and an intent, for the request. The computing device may generate a response to the request based on the determined intent and entities.

In some embodiments, a system includes a database, and a computing device communicatively coupled to the database. Further, the computing device configured to receive input data comprising a plurality of characters. The computing device is also configured to apply a natural language model to the input data to generate first output embeddings. The computing device is further configured to apply a dependency based model to the input data to generate second output embeddings. The computing device is further configured to determine, based on applying a classifier model to the first output embeddings and the second output embeddings, output values. The computing device is also configured to store the third output values in the database.

In some embodiments, a method includes receiving input data comprising a plurality of characters. Further, the method includes applying a natural language model to the input data to generate first output embeddings. The method also includes applying a dependency based model to the input data to generate second output embeddings. Further, the method includes determining, based on applying a classifier model to the first output embeddings and the second output embeddings, output values. The method also includes storing the third output values in the database.

In some embodiments, a non-transitory computer readable medium has instructions stored thereon. The instructions, when executed by at least one processor, cause a device to perform operations including receiving input data comprising a plurality of characters. Further, the operations include applying a natural language model to the input data to generate first output embeddings. The operations also include applying a dependency based model to the input data to generate second output embeddings. Further, the operations include determining, based on applying a classifier model to the first output embeddings and the second output embeddings, output values. The operations also include storing the third output values in the database.

BRIEF DESCRIPTION OF THE DRAWINGS

The features and advantages of the present disclosures will be more fully disclosed in, or rendered obvious by the following detailed descriptions of example embodiments.

The detailed descriptions of the example embodiments are to be considered together with the accompanying drawings wherein like numbers refer to like parts and further wherein.

DETAILED DESCRIPTION

Figure 1:
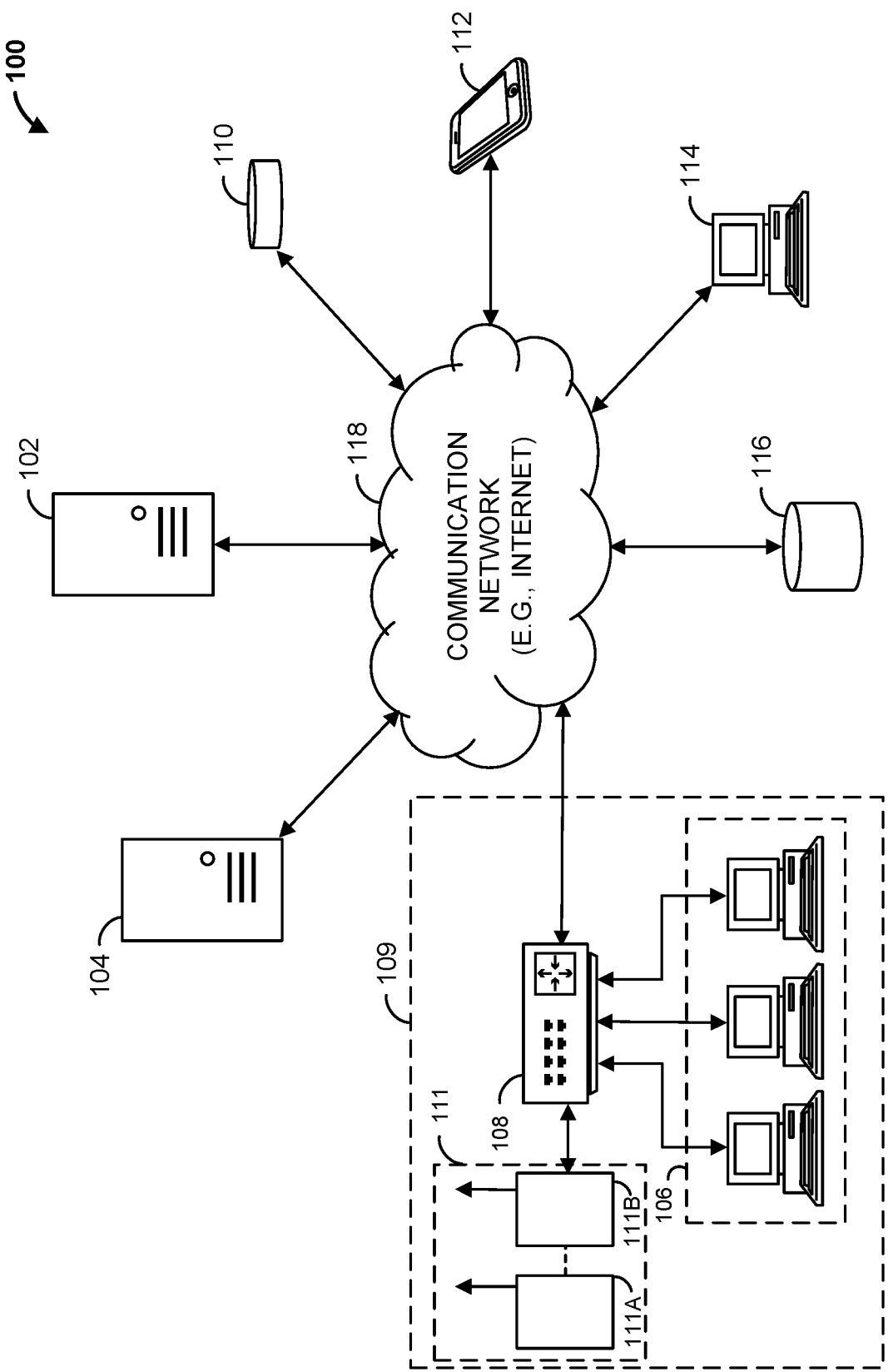
FIG. 1 is a block diagram of a natural language understanding (NUL) system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

The embodiments employ machine learning processes to determine results of one or more Natural Language Understanding (NLU) tasks. The machine learning processes may employ a natural language model, which is trained on retail data, and operates on input data characterizing textual information to determine the input data's intent. The natural language model may be a Bidirectional Encoder Representation from Transformers (BERT) model, such as a two layer or four layer BERT model. Retail data may include item catalog data (e.g., item titles, item descriptions, etc.) and chat log data (e.g., data received from customers through chat interfaces), for example.

Moreover, the machine learning processes may employ a dependency embedding generation model that provides dependency-based word embeddings to the machine learning processes to provide external syntactic context. The use of these syntactic dependencies (e.g., between words in a sentence) can improve the quality of embeddings and hence the performance on various NLU tasks, such as part-of-speech (POS) tagging, named entity recognition (NER), title compression, and sentiment analysis.

Textual data, such as textual data received from a voice assistant or through a chatbot interface, may be provided to the natural language model and the dependency embedding generation model, each of which may generate output data. The output data from each of the natural language model and the dependency embedding generation model is concatenated, and the concatenated data is provided to an intent and entity classifier model to identify and tag (e.g., label) entities of the textual data, and to determine an intent of the received textual data. The intent and entity classifier model may include hyperparameters, or weights, that are used for entity tagging and are trained based on intent classification. Thus, the intent and entity classifier model may allow for a joint modeling of intent classification and entity recognition that can improve the tagging of entities by the weights leveraged from the intent classification.

Moreover, a response to received textual data may then be generated based on the tagged entities and determined intent. For example, a response to a command, or inquiry, may be generated. As an example, textual data identifying "Add Great Value Milk" may be received from a voice assistant or chatbot interface. The machine learning processes may operate on the textual data to determine an intent and entities of the textual data. In this example, the intent may be "add_to_cart" (e.g., add items to an online shopping cart of a retail website), and the entities may be "product=milk," and "brand=great value." Based on the determined intent and entities, a dialog manager may then generate a response, such as "Ok, I found Great Value milk 1 gallon. Would you like me to add it to your cart?," and the response may be transmitted in response to the received textual data.

Turning to the drawings, FIG. 1 illustrates a block diagram of a natural language understanding system 100 that includes natural language processing (NLP) computing device 102 (e.g., a server, such as an application server), web server 104, workstation(s) 106, associate computing devices 111A, 111B, database 116, and multiple customer computing devices 110, 112, 114 operatively coupled over network 118. NLP computing device 102, workstation(s) 106, web server 104, associate computing devices 111A, 111B, and multiple customer computing devices 110, 112, 114 can each be any suitable computing device that includes any hardware or hardware and software combination for processing and handling information. For example, each of NLP computing device 102, web server 104, workstations 106, associate computing devices 111A, 111B, and multiple customer computing devices 110, 112, 114 can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, NLP computing device 102 can be a computer, a workstation, a laptop, a server such as a cloud-based server, or any other suitable device. Each of associate computing devices 111A, 111B and multiple customer computing devices 110, 112, 114 can be a mobile device such as a cellular phone, a laptop, a computer, a table, a personal assistant device, a voice assistant device, a digital assistant, or any other suitable device.

Although FIG. 1 illustrates three customer computing devices 110, 112, 114, natural language understanding system 100 can include any number of customer computing devices 110, 112, 114. Similarly, natural language understanding system 100 can include any number of workstation(s) 106, fraud detection computing devices 102, web servers 104, associate computing devices 111A, 111B, and databases 116.

Workstation(s) 106 are operably coupled to communication network 118 via router (or switch) 108. Workstation(s) 106 and/or router 108 may be located at a store 109, for example. In some examples, workstation 106 is a register at store 109. Workstation(s) 106 can communicate with NLP computing device 102 over communication network 118. The workstation(s) 106 may send data to, and receive data from, data mapping computing device 102. For example, the workstation(s) 106 may transmit data related to a transaction, such as a purchase transaction, to NLP computing device 102. Workstation(s) 106 may also communicate with web server 104. For example, web server 104 may host one or more web pages, such as a retailer's website. Workstation(s) 106 may be operable to access and program (e.g., configure) the webpages hosted by web server 104.

Furthermore, associate computing devices 111A, 111B, may be operated by associates of store 109. Associate computing devices 111A, 111B may communicate with, for example, NLP computing device 102 over communication network 118. For example, each of associate computing devices 111A, 111B may establish a chatbot session with NLP computing device 102, which may host a virtual chatbot or virtual assistant. Associates may provide inquiries, such as "When is the next delivery of milk?," into a digital interface (e.g., chatbot "App") of an associate computing devices 111A, 111B, which may be transmitted to NLP computing device 102. NLP computing device 102 may apply one or more natural language understanding (NLU) tasks to the inquiry to generate a response, and may transmit the response, such as data characterizing "The next delivery of milk for your store is on Tuesday, April 12," to the associate device 111A, 111B. The associate device 111A, 111B receiving the response may display the response within the digital interface.

Similarly, each of customer computing devices 110, 112, 114 may establish a chatbot session with NLP computing device 102. For example, a customer may provide a command, such as "Add Great Value Milk," through a digital interface (e.g., chatbot "App" for a voice shopping assistant) of a customer computing devices 110, 112, 114. The customer computing device 110, 112, 114 may transmit the command to NLP computing device 102. NLP computing device 102 may apply one or more NLU tasks to the command to generate a response, and may transmit the response, such as data characterizing "Ok, I found Great Value milk 1 gallon. Would you like me to add it to your cart?," to the associate device 111A, 111B. The associate device 111A, 111B receiving the response may display the response within the digital interface. In some examples, NLP computing device 102 maintains a chat log within a database, where the chat log identifies and characterizes previous chatbot sessions.

In some examples, a customer computing device 110, 112, 114 may be a voice assistant, or may include voice assistant capability. For example, a customer may speak a command (e.g., verbal command) to the customer computing device 110, 112, 114, which may translate the speech into textual data characterizing the command, and may transmit the textual data to NLP computing device 102. NLP computing device 102 may apply one or more NLU tasks to the textual data to generate a response, and may transmit the response to the customer computing device 110, 112, 114. The customer computing device 110, 112, 114 may respond to the customer's command based on the received response. For example, the customer computing device 110, 112, 114 may apply one or more text-to-speech processes to the response received from NLP computing device 102 to generate audio, and may play the audio for the customer.

First customer computing device 110, second customer computing device 112, and $N^{th}$ customer computing device 114 may also communicate with web server 104 over communication network 118. For example, web server 104 may host one or more webpages of a website. Each of multiple computing devices 110, 112, 114 may be operable to view, access, and interact with the webpages hosted by web server 104. In some examples, web server 104 hosts a web page for a retailer that allows for the purchase of items. For example, an operator of one of multiple computing devices 110, 112, 114 may access the web page hosted by web server 104, add one or more items to an online shopping cart of the web page, and perform an online checkout of the shopping cart to purchase the items.

Database 116 can be a remote storage device, such as a cloud-based server, a memory device on another application server, a networked computer, or any other suitable remote storage. NLP computing device 102 is operable to communicate with database 116 over communication network 118. For example, NLP computing device 102 can store data to, and read data from, database 116. Although shown remote to NLP computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Machine Learning Processes for a Voice Assistant

NLP computing device 102 may include voice assistant capabilities that allow for the reception of input textual data, such as commands such as inquiries, through a programmatic interface, and further generates output textual data characterizing a response to the input textual data. The voice assistant capabilities include Natural Language Understanding (NLU) tasks that facilitate the voice assistant capabilities. NLU tasks may include, for example, part-of-speech (POS) tagging, intent detection, named entity recognition (NER), title compression, and sentiment analysis. Further, and to support these and other NLU tasks, NLP computing device 102 may employ one or more machine learning processes that operate on the received input textual data. For example, NLP computing device 102 can apply one or more machine learning processes to received textual data to determine an output for one or more of the NLU tasks.

In some examples, the machine learning processes include a natural language model, such as a Bidirectional Encoder Representation from Transformers (BERT) model, which operates on textual data, such as textual data received from one of customer computing devices 110, 112, 114 or associate computing devices 111A, 111B. The natural language model may be trained on retail data, including item catalog data and chat log data. For example, the natural language model may be trained on a relatively small corpus consisting of 750 MB of data (i.e., 24,940,677 instances), with approximately 20% of data comprising from chat log data and 75% comprising item catalog data. In some examples, the natural language model is a DistilBERT model and is configured for training with a maximum sequence length of 128, a maximum percentage of tokens to be masked in a sentence of 0.15, a maximum number of predictions per sentence of 0.20, a number of samples from a single sentence of 2, and a learning rate of 2 e-5 (i.e., $2\times10^{-5}$).

In some examples, the natural language model is a DistilBERT model that includes two or four layers, and provides Masked Language Modelling and Next Sentence Prediction. The natural language model may operate on input textual data to generate tagged embeddings (e.g., tagged word embeddings), which in some examples are then passed through a linear layer (e.g., a linear neural network layer). Further, the machine learning processes may include a dependency embedding generation model (e.g., syntactic dependency based model) that generates dependency-based word embeddings. In some examples, the dependency-based word embeddings are passed through a single layer transformer block, which encodes the input representation that is retrieved from the dependency embedding generation model, and updates the encoded representation into contextual embeddings. The output of the single layer transformer block is then passed through a linear layer.

Joint Intent-Entity Detection

The output of each of the natural language model and the dependency embedding generation model is concatenated (e.g., at every time step) to generate concatenated word embeddings, and the concatenated word embeddings are provided to an intent and entity classifier to tag the concatenated word embeddings with entities and determine their intent. For example, the natural language model and the dependency embedding generation model may each operate on textual data identifying "Add Great Value Milk" received through a chatbot interface. NLP computing device 102 may tokenize the received textual data (e.g., using WordPiece tokenizer), and provide the tokens to each of the natural language model and the dependency embedding generation model to generate output embeddings. The output embeddings from each of the natural language model and the dependency embedding generation model may be concatenated, and provided to the intent and entity classifier to determine an intent and entities of the textual data. In other words, each word's embedding that is retrieved from the natural language model is concatenated with the word's embedding retrieved from the dependency embedding generation model. In some examples, the concatenation is performed in a stepwise fashion, meaning that the order of concatenation of word embeddings is preserved. In this example, the intent and entity classifier may generate data characterizing an intent of "add_to_cart" (e.g., add items to an online shopping cart of a retail website), and data characterizing entities such as "product=milk," and "brand=great value." Because the model jointly caters to both Intent Detection and Entity Recognition task, the number of required hyperparameters parameters and latency are reduced.

In some examples, input data (e.g., input text) is tokenized and passed to the natural language model which generates a sequential output for each token along with a pooled output representing the complete input data. This pooled output is further passed through a linear layer to predict an Intent class, while a sequence output is generated for each token, and is passed through a separate linear layer to predict the Named Entity tag for each token (the linear layers may be part of the intent and entity classifier). The output of the linear layers may be intent and entity logits, respectively. In some examples, the output of the linear layers are normalized. For example, the outputs may be passed to softmax (SM) modules that generate output data characterizing the entities and intent.

Contextual Intent Detection

In some examples, a neural network is employed that takes into account a conversational history of a user, such as a customer or retailer associate, along with a latest intent, to proactively predict a next intent. As such, inclusion of the neural network may aid a user in reducing the time to complete a given task, along with lowering conversational confusion, thereby resulting in more successful conversations. The neural network may be a two layered neural network whereby a tokens characterizing a current intent and conversational history is passed through the neural network to generate output embeddings. The output embeddings are concatenated with the output embeddings from the natural language model, and the concatenated embeddings are provided to the intent and entity classifier for intent and entity classification. As an example, if textual input data characterizing "remove an item from cart" is received, the intent and entity classifier may determine an intention to "show_my_cart."

Sentiment Analysis

In some examples, the machine learning processes analyze textual data to determine a sentiment, such as a positive, negative, or neutral connotation. To determine the sentiment, the machine learning processes may tokenize received textual data, and may provide the tokens to the trained natural language model (e.g., the BERT model trained with retail data) to generate output embeddings characterizing the sentiment. In some examples, the output embeddings of the natural language model are passed through a linear layer to generate output data. The output data may be passed through a softmax function to generate data characterizing the sentiment (e.g., 0=neutral, 1=positive, −1=negative).

Title Compression

Items, such as items sold by retailers, sometimes include relatively long titles. The titles may include granular information like the size, brand, tech specifications, and other finer details. Providing such verbose titles to the users directly would hurt user experience, as the user may not be interested in all of these details, and thus the shortening of titles enhances the user experience. As such, and in some examples, the machine learning processes analyze a title of an item, such as an item description, to determine a shortened title that may be provided during, for example, a chatbot session. For example, the machine learning processes may tokenize a title for an item, such as an item title with catalog data stored in database 116, and provide the generated tokens to the trained natural language model (e.g., BERT model). The natural language model may operate on the received tokens to generate output embeddings characterizing a shortened title. In some examples, the output embeddings of the natural language model are passed through a linear layer to generate output data. The output data may be passed through a softmax function to generate data characterizing the shortened title. In some examples, the shortened title is limited to a maximum number of characters (e.g., words).

Figure 2:
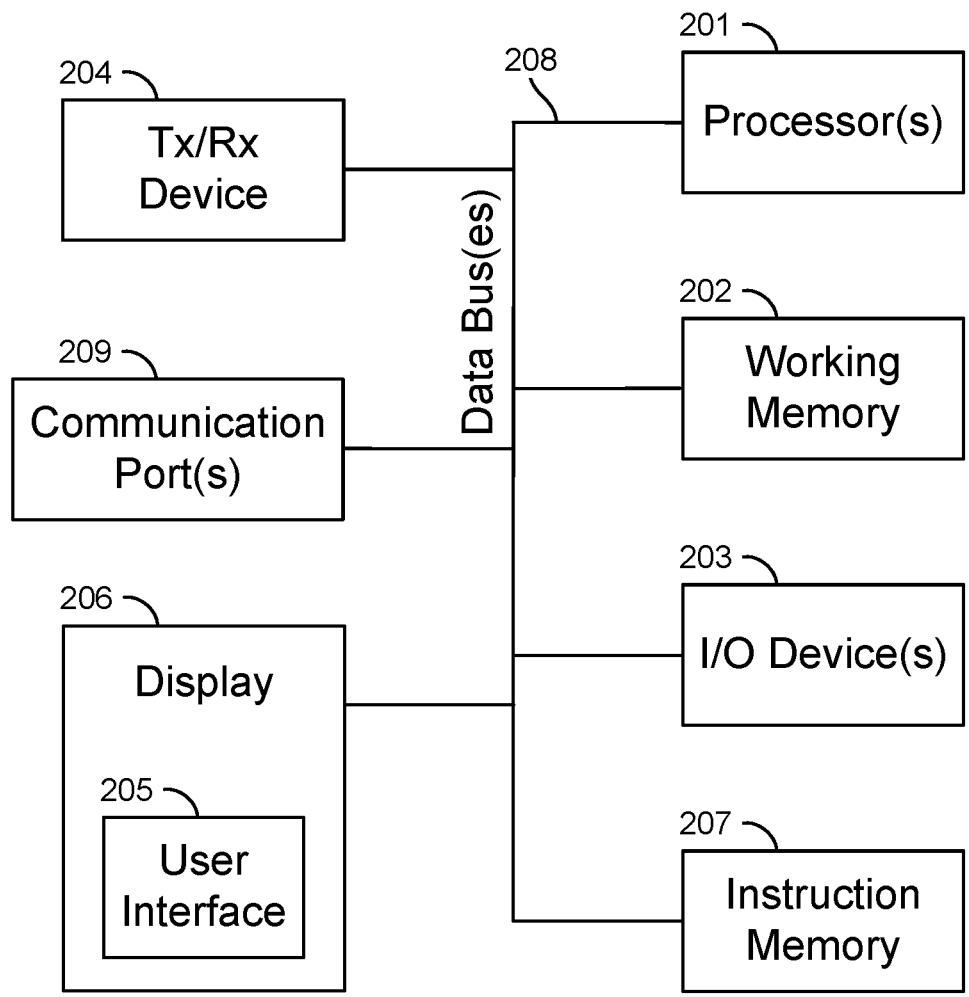
FIG. 2 is a block diagram of an exemplary natural language processing (NLP) computing device in accordance with some embodiments.

FIG. 2 illustrates an exemplary NLP computing device 102 of FIG. 2. NLP computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of NLP computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as training data.

Display 206 can display user interface 205. User interfaces 205 can enable user interaction with NLP computing device 102. For example, user interface 205 can be a user interface for an application of a retailer that allows a customer to purchase one or more items from the retailer. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 NLP computing device 102 will be operating in. Processor(s) 201 is operable to receive data from, or send data to, a network, such as communication network 118 of FIG. 1, via transceiver 204.

Figure 3:
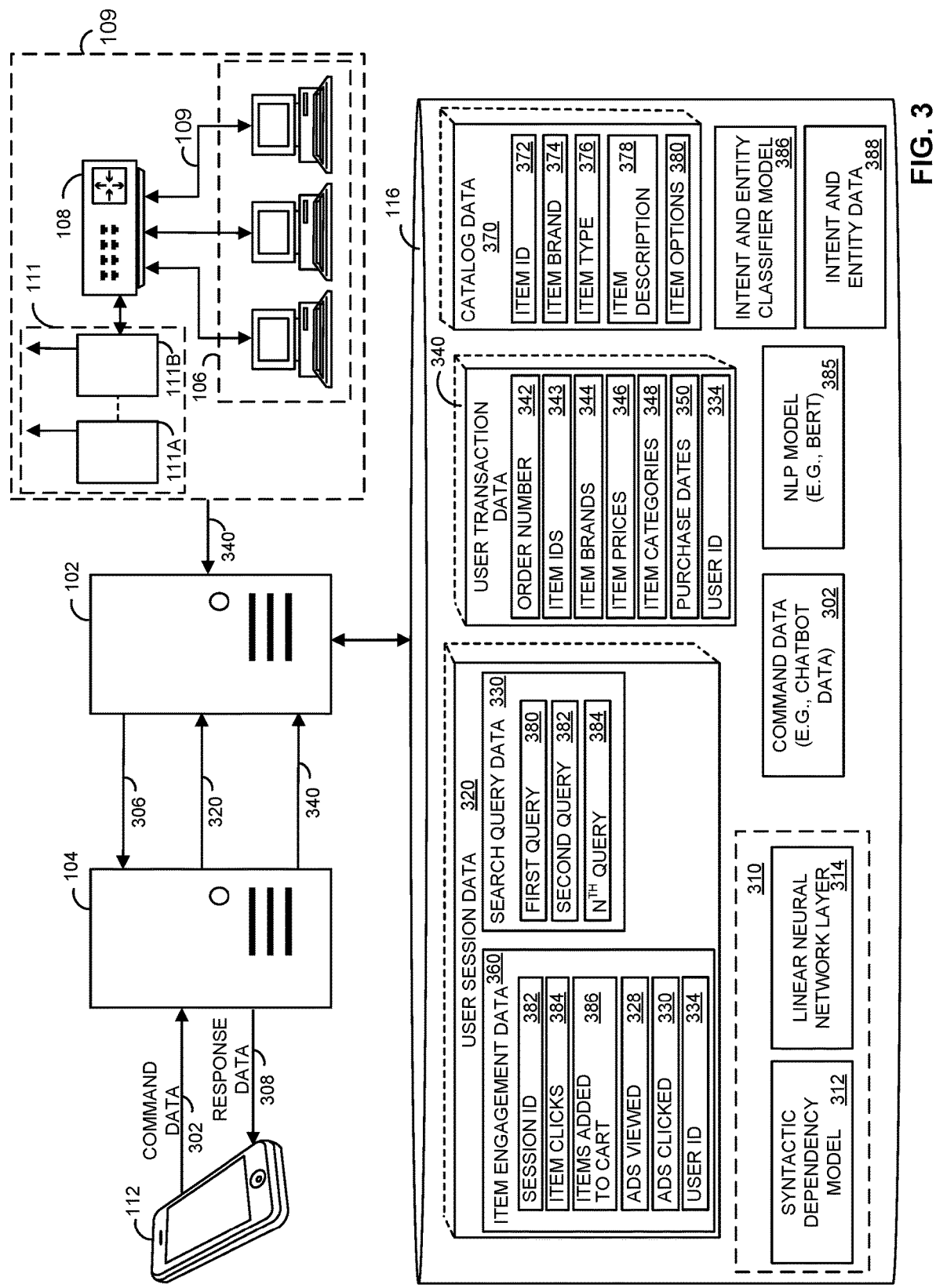
FIG. 3 is a block diagram illustrating examples of various portions of the natural language understanding system of FIG. 1 in accordance with some embodiments.

FIG. 3 is a block diagram illustrating examples of various portions of the natural language understanding system of FIG. 1. In this example, NLP computing device 102 can receive from a store 109 (e.g., from a computing device, such as workstation 106, at store location 109) user transaction data 340 characterizing the purchase, by a customer, of one or more items at store 109. Similarly, NLP computing device 102 may receive user transaction data 340 from web server 104, which identifies and characterizes one or more online purchases, such as from a retailer's website. Item ranking computing device 102 may store user transaction data 340 within database 116. In this example, user transaction data 340 may include, for each purchase, one or more of an order number 342 identifying a purchase order, item IDs 343 identifying one or more items purchased in the purchase order, item brands 344 identifying a brand for each item purchased, item prices 346 identifying the price of each item purchased, item category 348 identifying a category of each item purchased, a purchase date 350 identifying the purchase date of the purchase order, and a user ID 334 (e.g., an identifier, such as a phone number, email address, user assigned ID, user name, household ID, etc.) for the user making the corresponding purchase.

Further, NLP computing device 102 may receive user session data 320 from web server 104, and store user session data 320 in database 116. User session data 320 identifies, for each user, data related to a browsing session, such as when browsing a retailer's webpage hosted by web server 104. In this example, user session data 320 includes item engagement data 360 and search query data 330. Item engagement data 360 includes a session ID 322 (i.e., a website browsing session identifier), item clicks 324 identifying items which the user clicked (e.g., images of items for purchase, keywords to filter reviews for an item), items added-to-cart 326 identifying items added to the user's online shopping cart, advertisements viewed 328 identifying advertisements the user viewed during the browsing session, advertisements clicked 330 identifying advertisements the user clicked on, and user ID 334 ID (e.g., a customer ID, retailer website login ID, etc.). Search query data 330 identifies one or more searches conducted by a user during a browsing session (e.g., a current browsing session). In this example, search query data 330 includes first query 380, second query 382, and $N^{th}$ query 384.

Database 116 may further store catalog data 370, which may identify one or more attributes of a plurality of items, such as a portion of or all items a retailer carries. Catalog data 370 may identify, for each of the plurality of items, an item ID 372 (e.g., an SKU number), item brand 374, item type 376 (e.g., grocery item such as milk, clothing item), item description 378 (e.g., a description of the product including product features, such as ingredients, benefits, use or consumption instructions, or any other suitable description), and item options 380 (e.g., item colors, sizes, flavors, etc.).

Database 116 may also store command data 302, which may include chatbot data, and identifies and characterizes previous exchanges with users, including customers and associates of a retailer, established between any of customer computing devices 110, 112, 144 or associate computing devices 111A, 111B and NLP computing device 102.

Further, database 116 stores dependency embedding generation model data 310, which may identify and characterize a dependency embedding generation model executable by NLP computing device 102. The dependency embedding generation model data 310 may identify and characterize, for example, a syntactic dependency model 312 as well as a linear neural network layer 314. The syntactic dependency model 312 may operate on tokens generated from input textual data to generate dependency-based word embeddings. In some examples, the dependency-based word embeddings are passed through the linear neural network layer 314, which may include a single layer transformer encoder followed by a linear neural network layer, to generate word embeddings.

Database 116 may also store NLP model data 385, which may identify and characterize a natural language model, such as a two layer or four layer DistilBERT model, model executable by NLP computing device 102. For example, NLP computing device 102 may execute NLP model data 385 to operate on tokens generated from input textual data to generate output embeddings. NLP model data 385 may further identify and characterize a corresponding linear layer, such as a linear neural network layer. NLP computing device 102 may execute the linear layer to operate on the output embeddings of the natural language model to generate output word embeddings. In some examples, NLP computing device 102 applies a softmax function to the output word embeddings of the linear layer to generate probability values (e.g., probability distributions).

Database 116 may further store intent and entity classifier model data 386, which identifies and characterizes an intent and entity classifier model executable by NLP computing device 102. NLP computing device 102 may apply the intent and entity classifier model to the output embeddings of the NLP model and the dependency embedding generation model to determine an intent and entities of corresponding input textual data. For example, NLP computing device 102 may concatenate the output embeddings from each of the NLP model and the dependency embedding generation model, and apply the intent and entity classifier model to the concatenated embeddings to generate intent and entity data 388, which identifies and characterizes a determined intent and entities. NLP computing device 102 may store the intent and entity data 388 within database 116.

In some examples, NLP computing device 102 may provide intent and entity data 388 to a dialog manager, which generates a response to received input textual data based on the intent and entity data 388. For example, NLP computing device 102 may receive an intent and entity request 304 from web server 104. Intent and entity request 304 may include, for example, command data 302 received by web server 104 from a customer computing device 112 during a browsing session of a website, such as a website hosted by web server 104. The command data 302 may include, for example, chatbot data, such as data characterizing a command or inquiry (e.g., "add great value milk"). NLP computing device 102 may generate tokens based on the command data 302, and apply the NLP model and the dependency embedding generation model to the generated tokens to generate corresponding output embeddings.

Further, NLP computing device 102 may concatenate the generated output embeddings, and may apply the intent and entity classifier model to the concatenated output embeddings to generate intent and entity data 388 characterizing an intent and entities of the command data 302. NLP computing device 102 may package the intent and entity data 388 within an intent and entity response 306, and transmit the intent and entity response 306 to web server 104. Further, web server 104 may extract the intent and entity from the received intent and entity response 306, and may further generate a response to the command data 302 based on the extracted intent and entities. For example, web server 104 may provide the extracted intent and entities to a dialog manager that generates the response (e.g., "Ok, I found Great Value milk 1 gallon. Would you like me to add it to your cart?").

Figure 4:
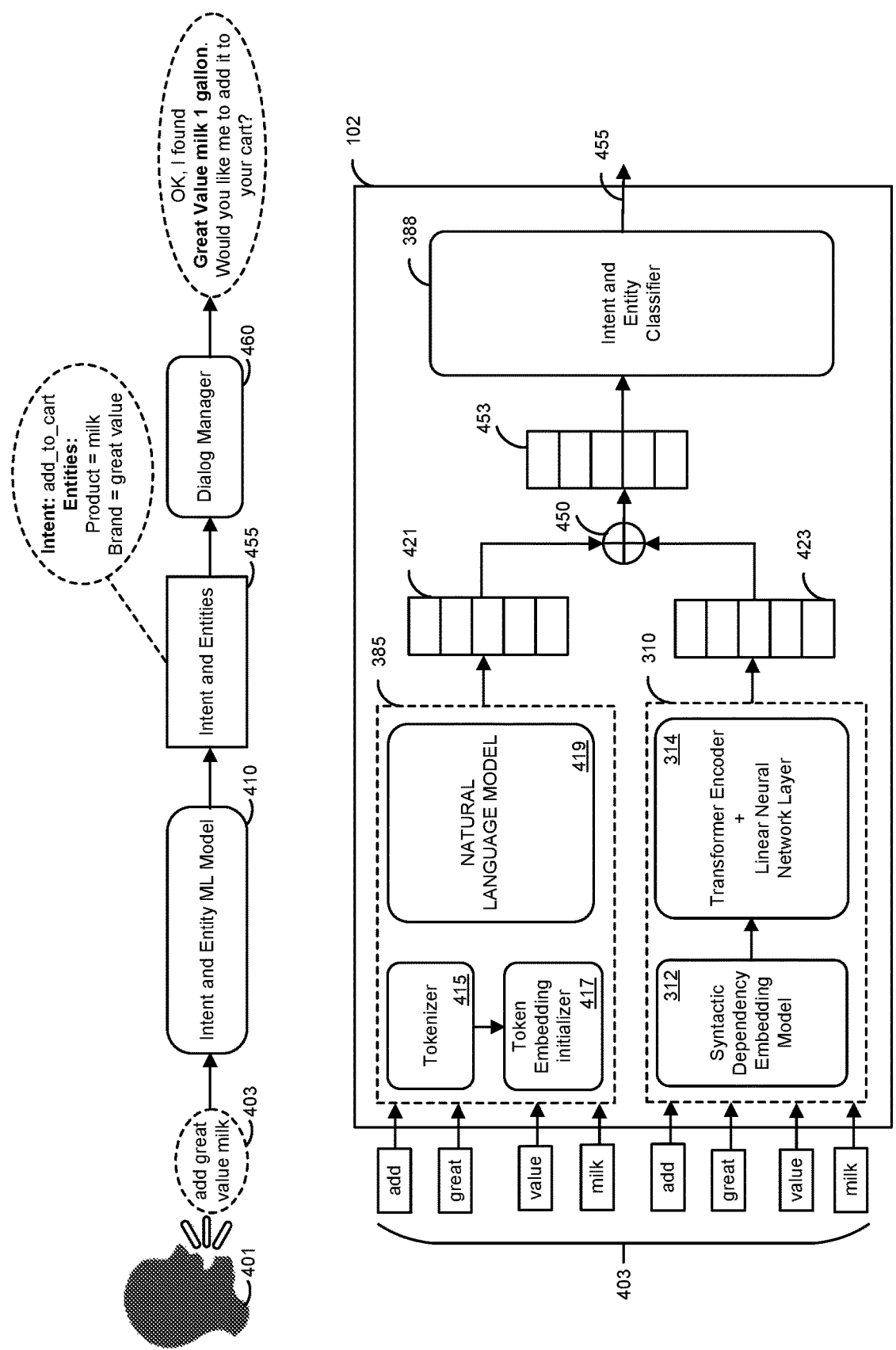
FIG. 4 is a block diagram illustrating examples of various portions of the natural language processing device of FIG. 2 in accordance with some embodiments.

FIG. 4 illustrates exemplary processing, by NLP computing device 102, of input textual data that may be received, for example, from a customer computing device 110, 112, 114. In this example, a user 401 speaks a command 403, in this example "Add Great Value Milk." NLP computing device 102 applies an intent and entity machine learning model 410 to the command 403 to generate output data 455 characterizing an intent and entities of command 403.

Intent and entity machine learning model 410 may include an NLP model characterized by NLP model data 385 and a dependency embedding generation model characterized by dependency embedding generation model data 310. NLP computing device 102 provides command 403 to each of the NLP model and the dependency embedding generation model. The NLP model may include a tokenizer 415, such as the WordPiece tokenizer, that generates tokens based on the command 403. Further, the NLP model may include a token embedding initializer 417 that initializes the tokens. For example, every token of every instance (e.g., sentence) may be initialized. Further, the NLP model includes a natural language model 419, such as a BERT model, that operates on the tokens generated by the tokenizer 415 to generate NLP output embeddings 421. In some examples, natural language model 419 generates output embeddings, and applies a linear layer to the output embeddings to generate NLP output embeddings 421.

The dependency embedding generation model may include a syntactic dependency embedding model 312 and a transformer encoder and linear neural network layer 314. The syntactic dependency embedding model 312 generates dependency-based word embeddings based on the command 403. In some examples, syntactic dependency embedding model 312 tokenizes the command 403, and operates on the generated tokens to generate the dependency-based word embeddings. Further, transformer encoder and linear neural network layer 314 may apply a transformer encoder to the generated dependency-based word embeddings to generate encoded data, and a linear neural network layer is applied to the encoded data to generate dependency output embeddings 423.

NLP computing device 102 may concatenate the NLP output embeddings 421 and the dependency output embeddings 423 to generate concatenated embeddings 453. The concatenation may be performed in a time stepwise manner. Further, intent and entity machine learning model 410 may include an intent and entity classifier, such as one characterized by intent and entity classifier data 388. The intent and entity classifier may operate on concatenated embeddings 453 to generate intent and entity data 455 identifying an intent, and entities, of command 403. For example, for the command 403 of "Add Great Value Milk," the intent and entity classifier may generate intent and entity data 455 characterizing an intent of "add_to_cart" (e.g., add items to an online shopping cart of a retail website), and entities (e.g., tagged labels) of "product=milk," and "brand=great value." NLP computing device 102 may store the intent and entity data 455 within a database, such as within database 116. In some examples, NLP computing device 102 transmits the intent and entity data 455, such as to web server 104.

In some examples, NLP computing device 102 provides the intent and entity data 455 characterizing the determined intent and entities of command 403 to a dialog manager 460. Dialog manager 460 may be an executable set of instructions that, when executed by one or more processors 206 of NLP computing device 102, can generate response data characterizing a response to command 403. In this example, dialog manager 460 may operate on intent and entity data 455 to generate response data characterizing a response 461, such as, in this example, "Ok, I found Great Value milk 1 gallon. Would you like me to add it to your cart?"

Figure 5A:
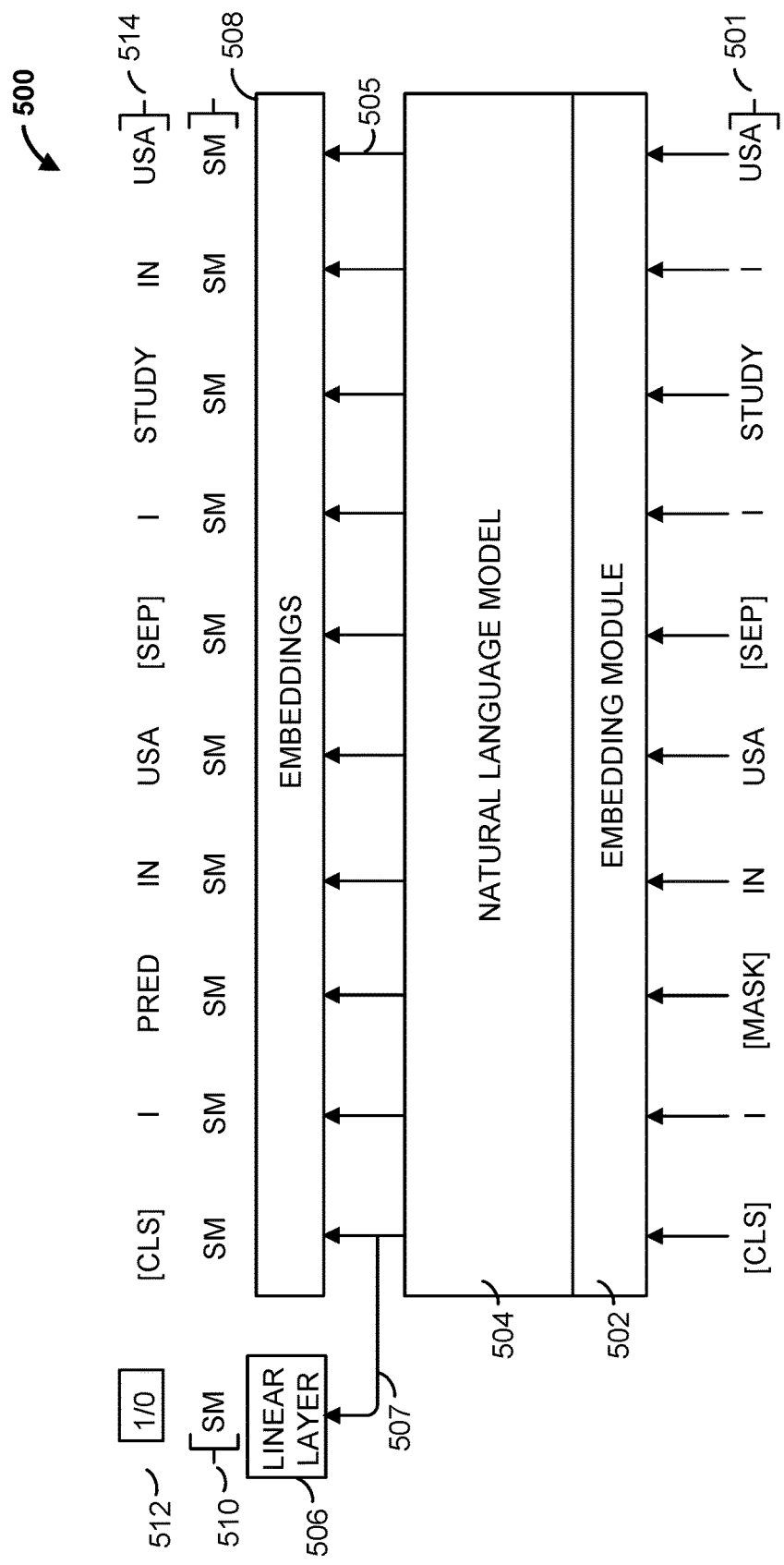
FIGS. 5A, 5B, 5C, 5D, 5E, and 5F illustrate diagrams of exemplary natural language processing architectures that may be implemented by the natural language processing device of FIG. 2 in accordance with some embodiments.

FIG. 5A illustrates an architecture 500 that may be implemented by NLP computing device 102 for training a natural language model 504, such as a BERT model. In this example, tokenized training data 501 is provided to an embeddings module 502 to generate word embeddings. The tokenized training data 501 may be based on retail data, such as catalog data and chatbot data. In this example, one of the word embeddings is masked for training (e.g., tagged with MASK). Moreover, a separation embedding (e.g., SEP) separates one set of input tokens from the next. The word embeddings are provided to the natural language model to generate a sequence output 505 for each token of the tokenized training data 501. A value of each sequence output 505 characterizes a raw vector embedding (e.g., before normalization) of each token in the sequence. The natural language model also generates a pooled output 507, which is the sequence output corresponding to just the first token (i.e., the "CLS" token).

Output embeddings 508 are generated based on the sequence output 505 for each token, where a softmax function is applied to the sequence output 505 to generate final output entity embeddings 514 characterizing an entity of each token of the tokenized training data 501. The final output entity embeddings 514 include a predicted output embedding, as identified by "PRED." Further, the pooled output 507 is passed through a linear layer 506, and a softmax function 510 is applied to the output of the linear layer 506 to generate final output intent embedding 512 that characterizes an intent of the tokenized training data 501. The final output intent embedding 512 may be a binary value that identifies whether a second sentence follows a first sentence. For example, a value of "0" indicates that the second sentence cannot be a next sentence (i.e., following the first sentence), and a value of "1" indicates that the second sentence can be the next sentence.

Figure 5B:
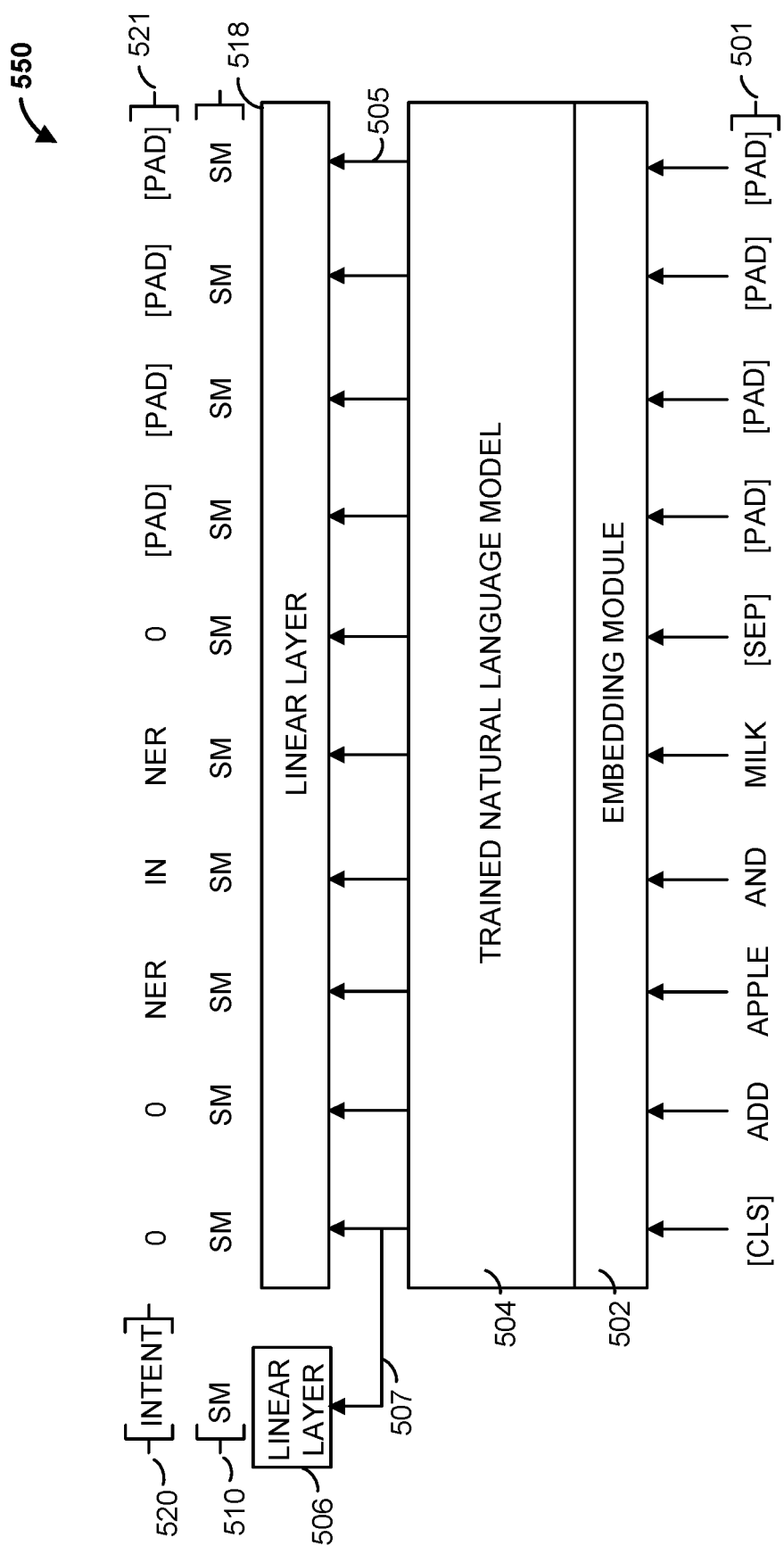

FIG. 5B illustrates an architecture 550 that may be implemented by NLP computing device 102 for determining entities, and an intent, of tokenized input data 501. FIG. 5B illustrates an example of generating an intent 520 and entities 521 using the trained natural language model 504 of FIG. 5A. In this example, architecture 550 emits a sequence output 505 for each token of tokenized input data 501, as well as a pooled output 507 that represents the sequence output for the CLS input token. The pooled output 507 is further passed through linear layer 506 to predict intent 520 after applying softmax function 510. In addition, the sequence output 505 generated for each token is passed through a separate linear layer 518, which is used to predict a named entity tag 521 for each token after applying the softmax function 510. For example, each named entity recognition (NER) tag identifies the entity.

Figure 5C:
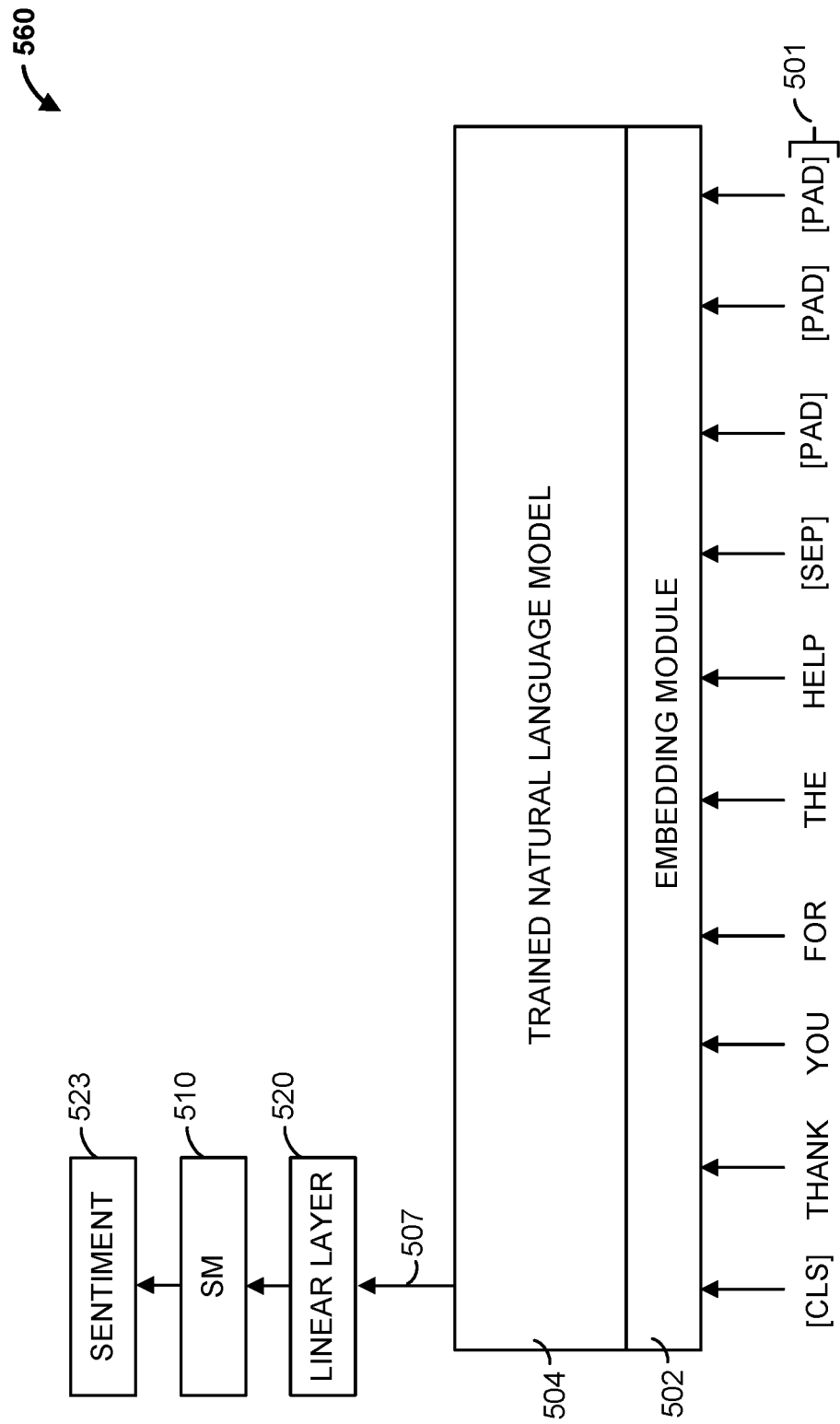

FIG. 5C illustrates an architecture 560 that may be implemented by NLP computing device 102 for determining a sentiment 523 based on input tokenized data 501. In this example, tokenized input data 501 is provided to embeddings module 502 to generate word embeddings. Trained natural language model 504 operates on the generated word embeddings to generate a pooled output 507 that is provided to linear layer 506. A softmax function 510 is applied to the output of linear layer 520 to generate sentiment 523. In some examples, sentiment 523 characterizes a positive, negative, or neutral sentiment of input tokenized data 501.

Figure 5D:
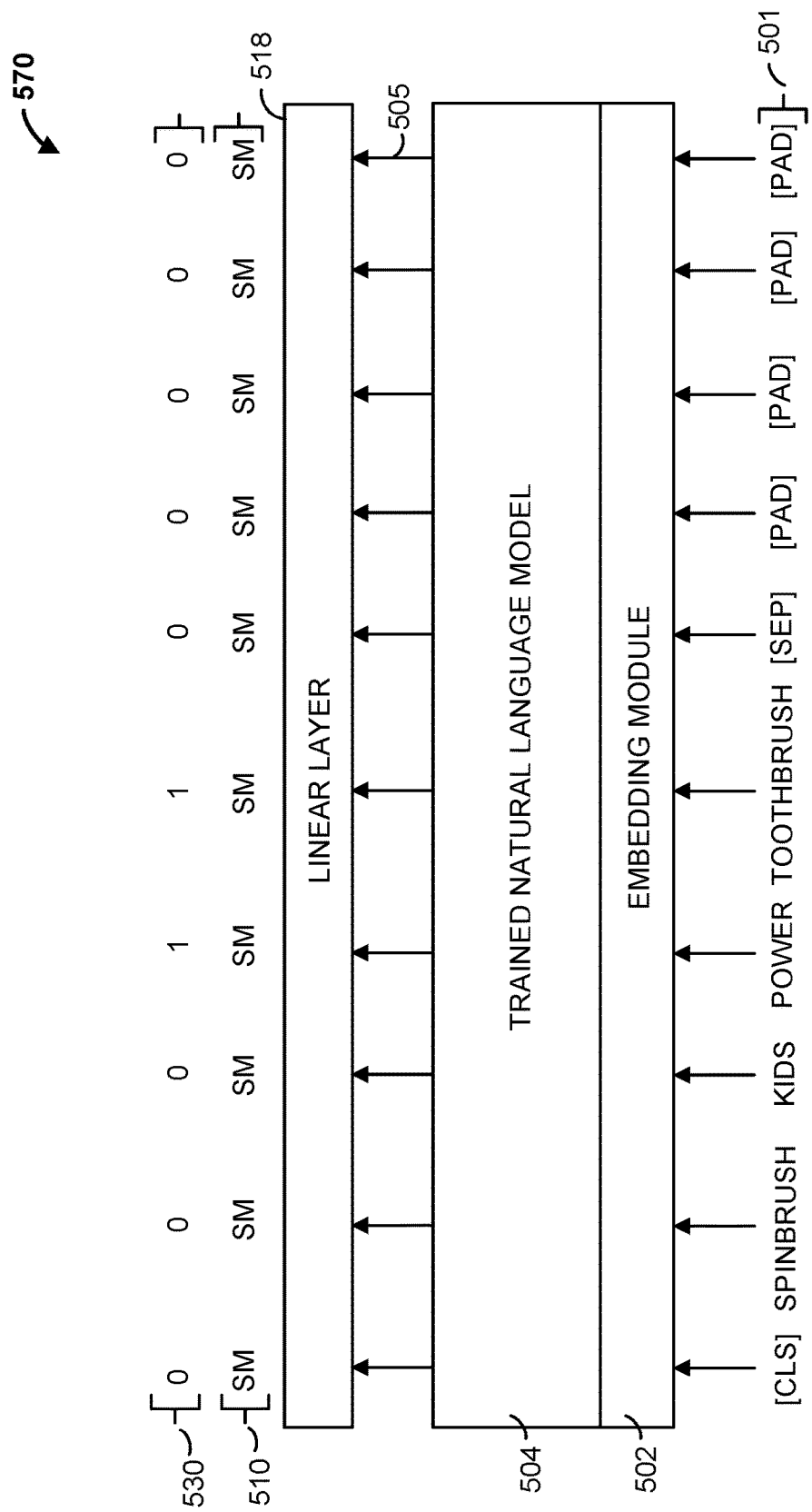

FIG. 5D illustrates an architecture 570 that may be implemented by NLP computing device 102 for determining a shortened title based on input tokenized data 501. In this example, tokenized input data 501 is provided to embeddings module 502 to generate word embeddings. Tokenized input data 501 may characterize an item title or description as contained within catalog data, such as catalog data 370. Trained natural language model 504 operates on the generated word embeddings to generate sequence output 505 for each token of the tokenized input data 501, and that is provided to linear layer 518. A softmax function 510 is applied to the output of linear layer 518 to generate output data 530 characterizing the shortened title. In this example, a value of "1" indicates the corresponding input token (as defined by input tokenized data 501) is kept, while a value of "0" indicates the corresponding input token is not kept. The kept input tokens define the shortened title. Thus, in this example, the shortened title for the input title of "Spinbrush Kids Power Toothbrush" is "Power Toothbrush."

Figure 5E:
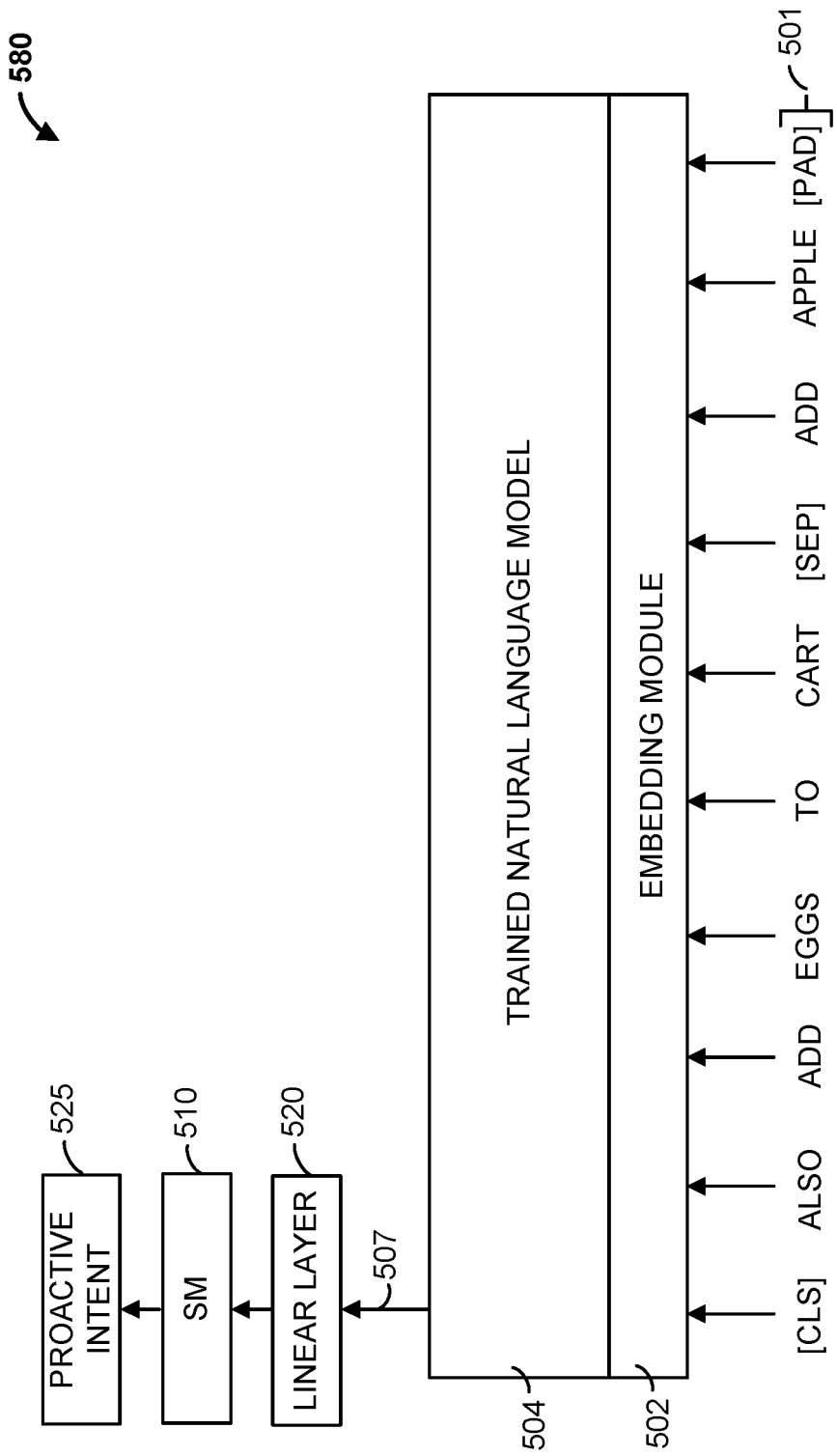

FIG. 5E illustrates an architecture 580 that may be implemented by NLP computing device 102 for determining a proactive intent 525 based on input tokenized data 501. In this example, tokenized input data 501 includes a previous context, such as data characterizing a command provided in a previous chat session (i.e., "Also Add Eggs to Cart"), and a current context, such as a query provided in a current chat session (i.e., "Add Apple"). The previous and current context are separated by the "SEP" token. Further, the tokenized input data 501 is provided to embeddings module 502 to generate word embeddings. Trained natural language model 504 operates on the generated word embeddings to generate a pooled output 507. The corresponding output of the "CLS" token identifies a probability that the current context follows the previous context. The pooled output 507 is provided to linear layer 506. A softmax function 510 is applied to the output of linear layer 520 to generate intent 525. In this example, intent 525 may be, for example, "Add_to_Cart." NLP computing device may label (e.g., tag) input tokenized data 501 with intent 525.

Figure 5F:
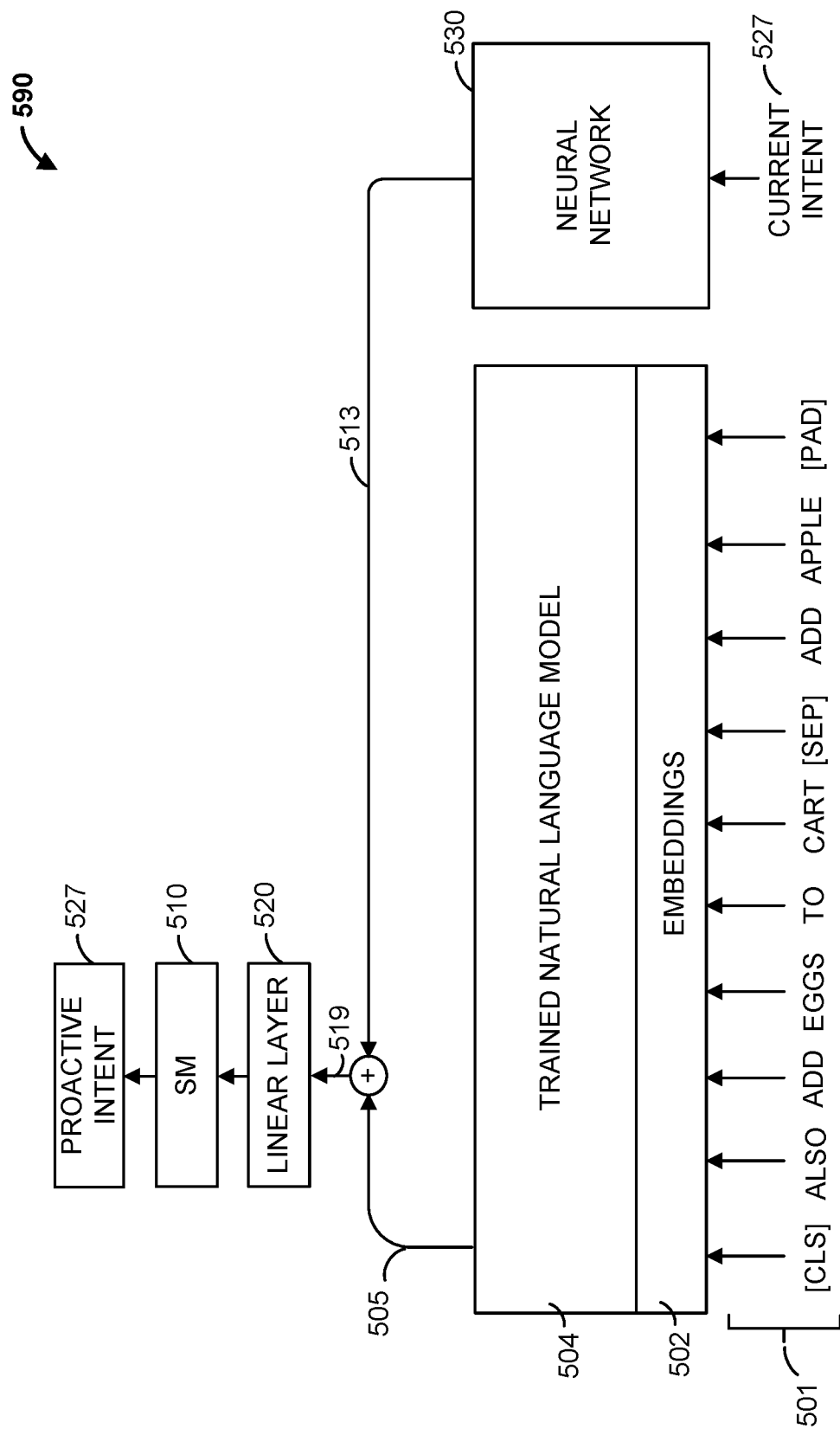

FIG. 5F illustrates an architecture 590 that may be implemented by NLP computing device 102 for determining a proactive intent 527, similar to architecture 580 of FIG. 5E, but further generates, and operates on, a current intent 527 to generate the proactive intent 527. In this example, tokenized input data 501 similarly includes the previous context and the current context, which are separated by the "SEP" token. The tokenized input data 501 is provided to embeddings module 502 to generate word embeddings, where trained natural language model 504 operates on the generated word embeddings. The output "CLS" embedding 505 (i.e., corresponding to the input "CLS" token) is concatenated with an output embedding 513 from a neural network 530 to generate a concatenated embedding 519. Neural network 530 may be a two layered neural network, and operates on current intent 527, which may be the previously determined intent 527. The concatenated embedding 519 is provide to linear layer 520. A softmax function 510 is applied to the output of linear layer 520 to generate intent 527.

Figure 6A:
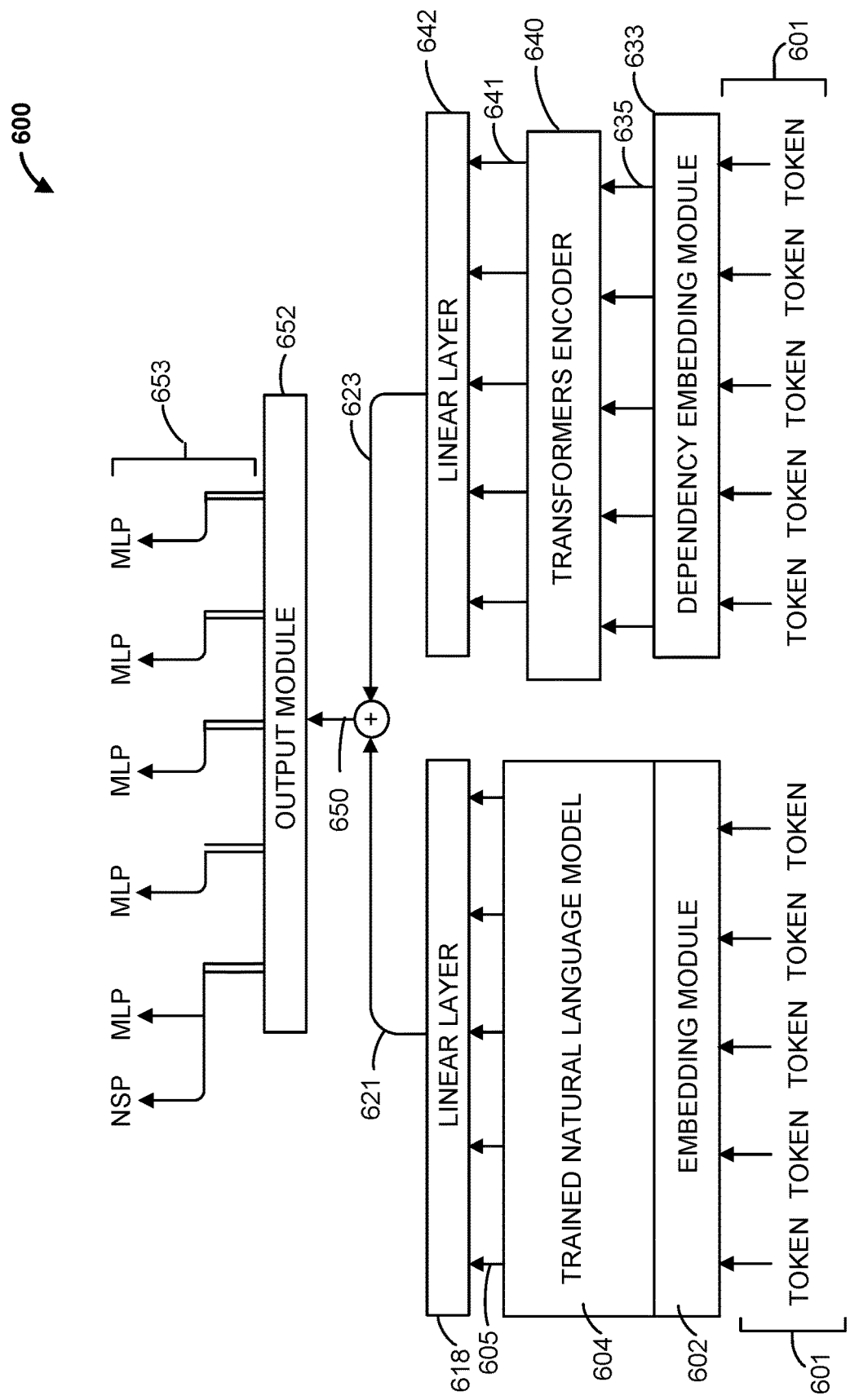
FIGS. 6A, 6B, and 6C illustrate diagrams of exemplary natural language processing architectures that may be implemented by the natural language processing device of FIG. 2 in accordance with some embodiments.

FIG. 6A illustrates an architecture 600 for determining a next sentence prediction value (NSP) and masked language modeling prediction values (MLP) based on applying machine learning processes to input tokenized data 601. Input tokenized data 601 may be based, for example, on received chat data (e.g., command 403). In this example, embedding module 602 generates word embeddings based on input tokenized data 601, and provides the word embeddings to trained natural language model 604. Trained natural language model 604 may be, for example, a two layer or four layer DistilBERT model. The trained natural language model 604 generates a sequence output 605 for each token of the tokenized input data 601, and provides the sequence output 605 to linear layer 618 to generate natural language embeddings 621.

Dependency embedding module 633 receives tokenized input data 601, generates dependency embeddings 635 based on the tokenized input data 601, and provides the dependency embeddings 635 to transformers encoder 640, which may include a single layer transformer block. Transformers encoder 640 encodes dependency embeddings 635, and updates them into contextual embeddings generated as encoded output data 641. Further, transformers encoder 640 provides the encoded output data 641 to linear layer 642 to generate dependency based embeddings 623.

The natural language embeddings 621 may then be concatenated with the dependency based embeddings 623 (e.g., at every time step) to generate concatenated embeddings 650. Output module 652 may receive concatenated embeddings 650, and generate output 653, which includes a next sentence prediction value (NSP), and masked language modeling prediction values (MLP).

Figure 6B:
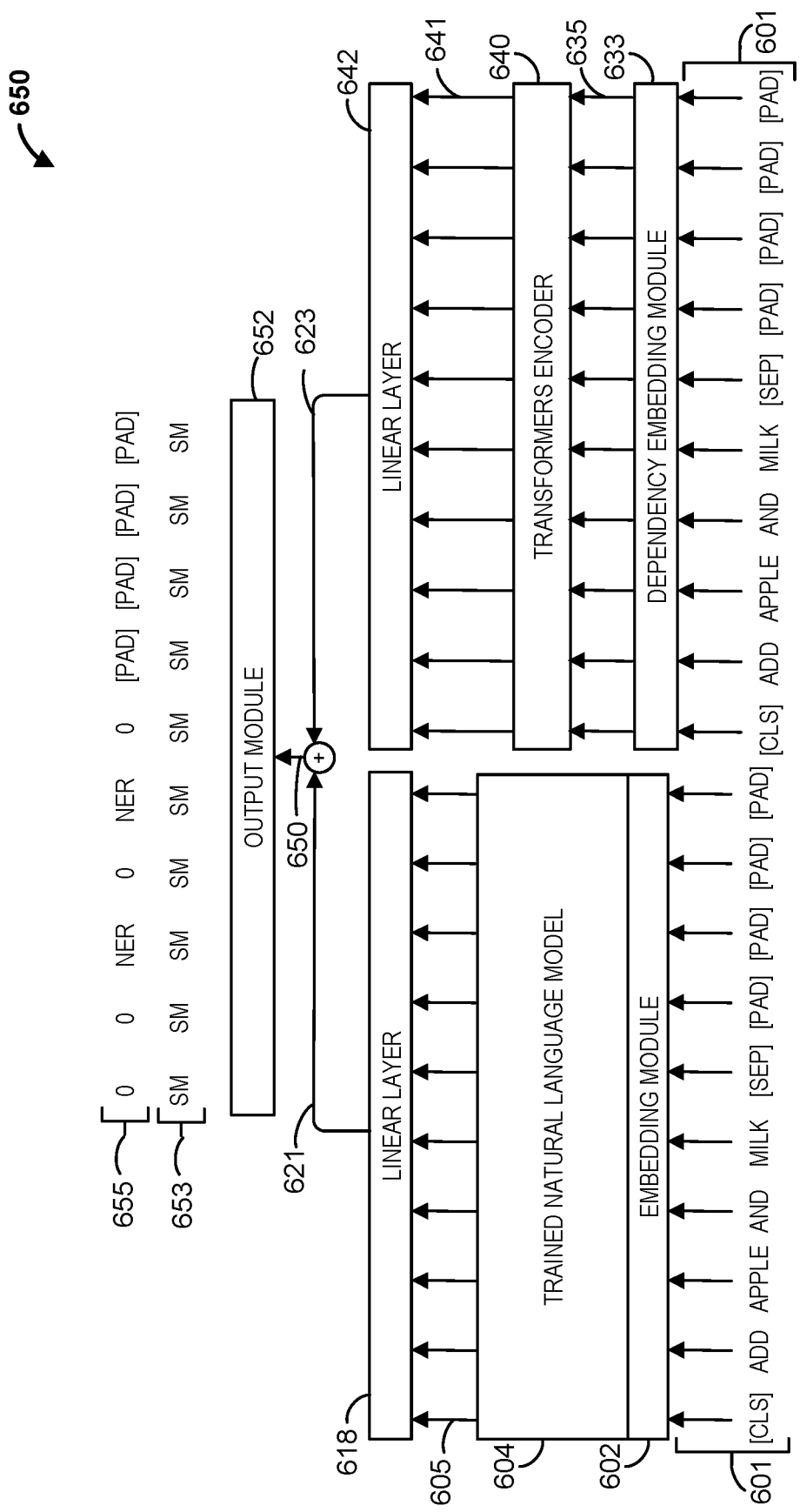

FIG. 6B illustrates an architecture 650 for determining an intent 655 based on applying machine learning processes to input tokenized data 601. Similar to architecture 600 of FIG. 6A, embedding module 602 generates word embeddings based on input tokenized data 601, and provides the word embeddings to trained natural language model 604. Trained natural language model 604 may be, for example, a two layer or four layer DistilBERT model. The trained natural language model 604 generates a sequence output 605 for each token of the tokenized input data 601, and provides the sequence output 605 to linear layer 618 to generate natural language embeddings 621.

Dependency embedding module 633 receives tokenized input data 601, generates dependency embeddings 635 based on the tokenized input data 601, and provides the dependency embeddings 635 to transformers encoder 640, which may include a single layer transformer block. Transformers encoder 640 generates encoded output data 641, which is provided to linear layer 642 to generate dependency based embeddings 623.

The natural language embeddings 621 may then be concatenated with the dependency based embeddings 623 (e.g., at every time step) to generate concatenated embeddings 650. Output module 652 may receive concatenated embeddings 650, and apply a softmax function 653 to the concatenated embeddings 650 to generate intent and entity tags 655. In this example, the first, second, fourth, and sixth input tokens are not entities, as indicated by the "0" values in intent 655. The third and fifth input tokens (i.e., "Apple" and "Milk") are determined to be entities, as indicated by the "NER" outputs. Thus, in this example, each of "Apple" and "Milk" may be named entities of "product." In addition the determined intent is based only on the CLS token of tokenized input data 601. In this example, the intent is "0."

Figure 6C:
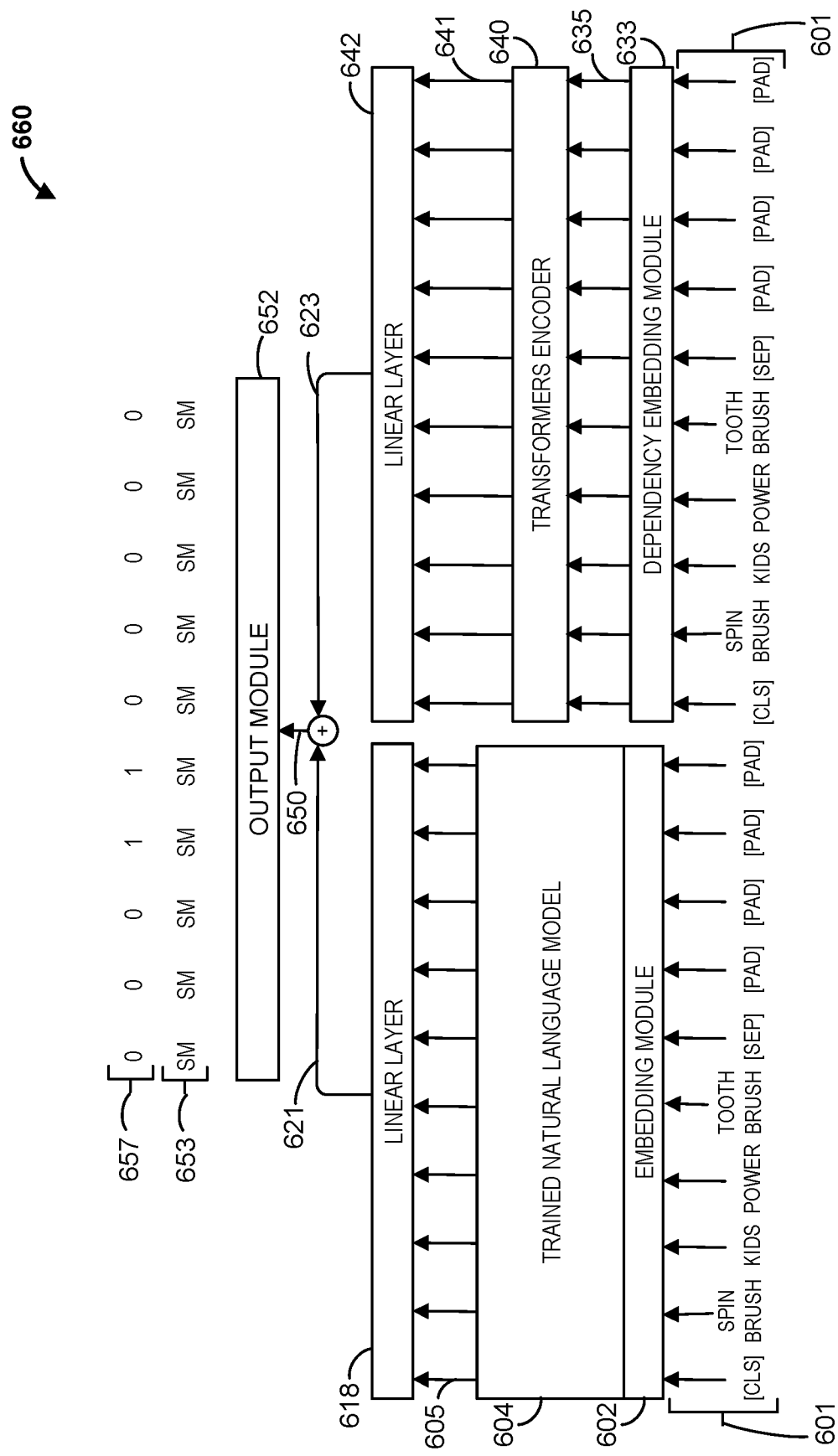

FIG. 6C illustrates an architecture 660 for determining a shortened title 657 based on applying machine learning processes to input tokenized data 601, which characterizes an item's title as stored, for example, within catalog data 370. Similar to architecture 650 of FIG. 6B, embedding module 602 generates word embeddings based on input tokenized data 601, and provides the word embeddings to trained natural language model 604. Trained natural language model 604 may be, for example, a two layer or four layer DistilBERT model. The trained natural language model 604 generates a sequence output 605 for each token of the tokenized input data 601, and provides the sequence output 605 to linear layer 618 to generate natural language embeddings 621.

Dependency embedding module 633 receives tokenized input data 601, generates dependency embeddings 635 based on the tokenized input data 601, and provides the dependency embeddings 635 to transformers encoder 640, which may include a single layer transformer block. Transformers encoder 640 generates encoded output data 641, which is provided to linear layer 642 to generate dependency based embeddings 623.

The natural language embeddings 621 may then be concatenated with the dependency based embeddings 623 (e.g., at every time step) to generate concatenated embeddings 650. Output module 652 may receive concatenated embeddings 650, and apply a softmax function 653 to the concatenated embeddings 650 to generate shortened title 657. In this example, only the fifth and sixth input tokens are determined to be part of shortened title 657, as indicated by the "1" values, where the remaining input tokens are determined not to be part of the shortened title, as indicated by the "0" values. Thus, in this example, shortened title 657 is "Power Toothbrush."

Figure 7:
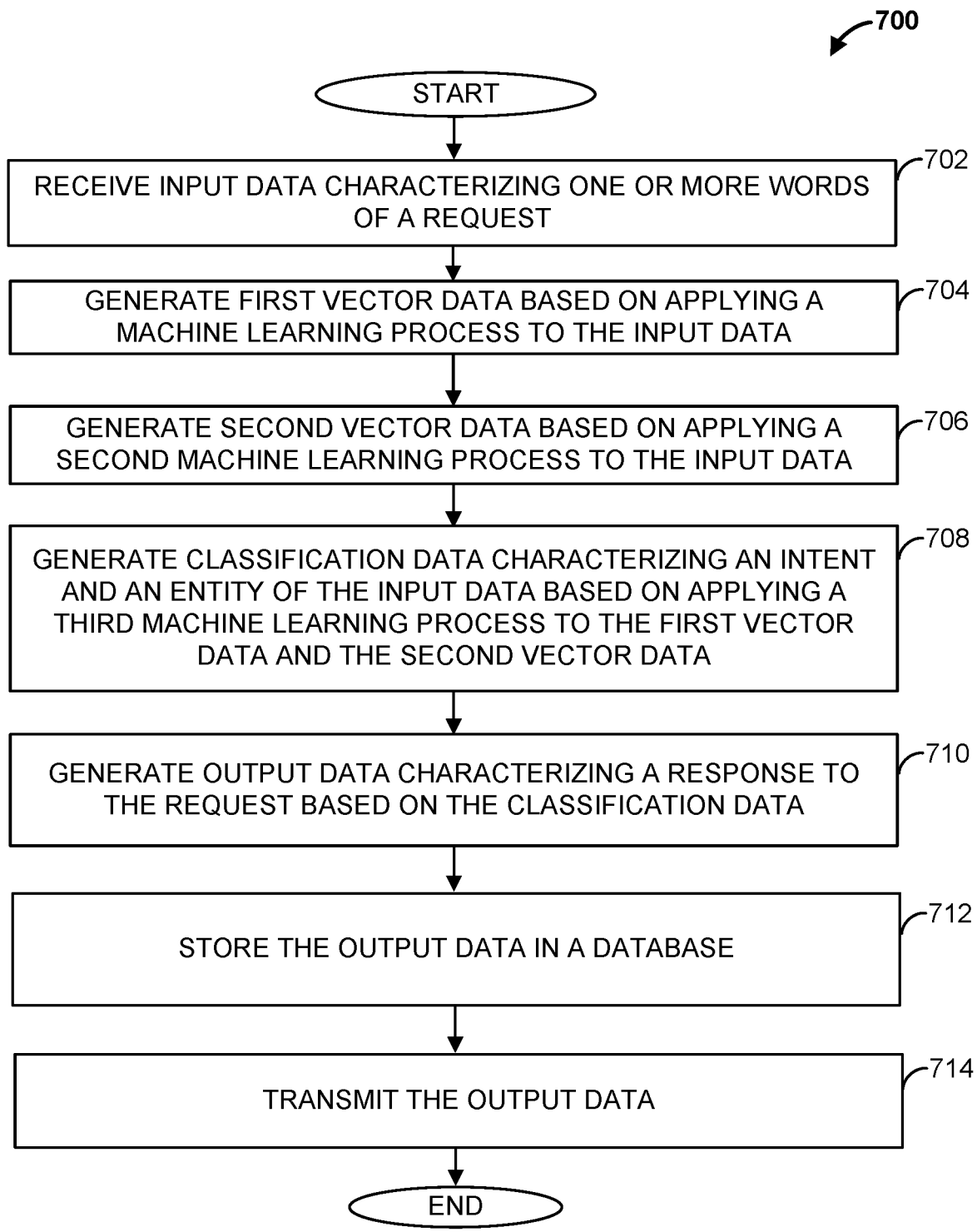
FIG. 7 is a flowchart of an example method that can be carried out by the natural language understanding system of FIG. 1 in accordance with some embodiments.

FIG. 7 is a flowchart of an example method 700 that can be carried out by the natural language understanding system 100 of FIG. 1. Beginning at step 702, input data characterizing one or more words of a request is received. For example, NLP computing device 102 may receive command 403 from web server 104, where command 403 characterizes a request by a customer, such as user 101. At step 704, first vector data is generated based on applying a first machine learning process to the input data. For example, NLP computing device 102 may apply a natural language model, such as one characterized by NLP model data 385, to the input data to generate first output embeddings (e.g., vectors that characterize words). At step 706, second vector data is generated based on applying a second machine learning process to the input data. For example, NLP computing device 102 may apply a dependency embedding generation model, such as one characterized by dependency embedding generation model data 310, to the input data to generate second output embeddings.

Proceeding to step 708, classification data is generated based on applying a third machine learning process to the first vector data and the second vector data. The classification data characterizes an intent and an entity (e.g., at least one entity) of the input data. For example, NLP computing device 102 may apply an intent and entity classifier model, such as one characterized by intent and entity classifier model data 386, to the output embeddings generated by the natural language model and the dependency embedding generation model. In some examples, NLP computing device concatenates the first vector data and the second vector data, and applies the third machine learning process to the concatenated vector data to generate the classification data.

At step 710, output data is generated. The output data characterizes a response to the request based on the classification data. For example, NLP computing device 102 may apply a softmax function to the generated classification data to normalize the classification data, and generate output data characterizing a probability distribution. Further, at step 712, the output data is stored in a database, such as within database 116. In some examples, and at step 714, the output data is transmitted. For example, NLP computing device 102 may transmit the output data to the web server 104 in response to receiving the input data from the web server 104. The method then ends.

Figure 8:
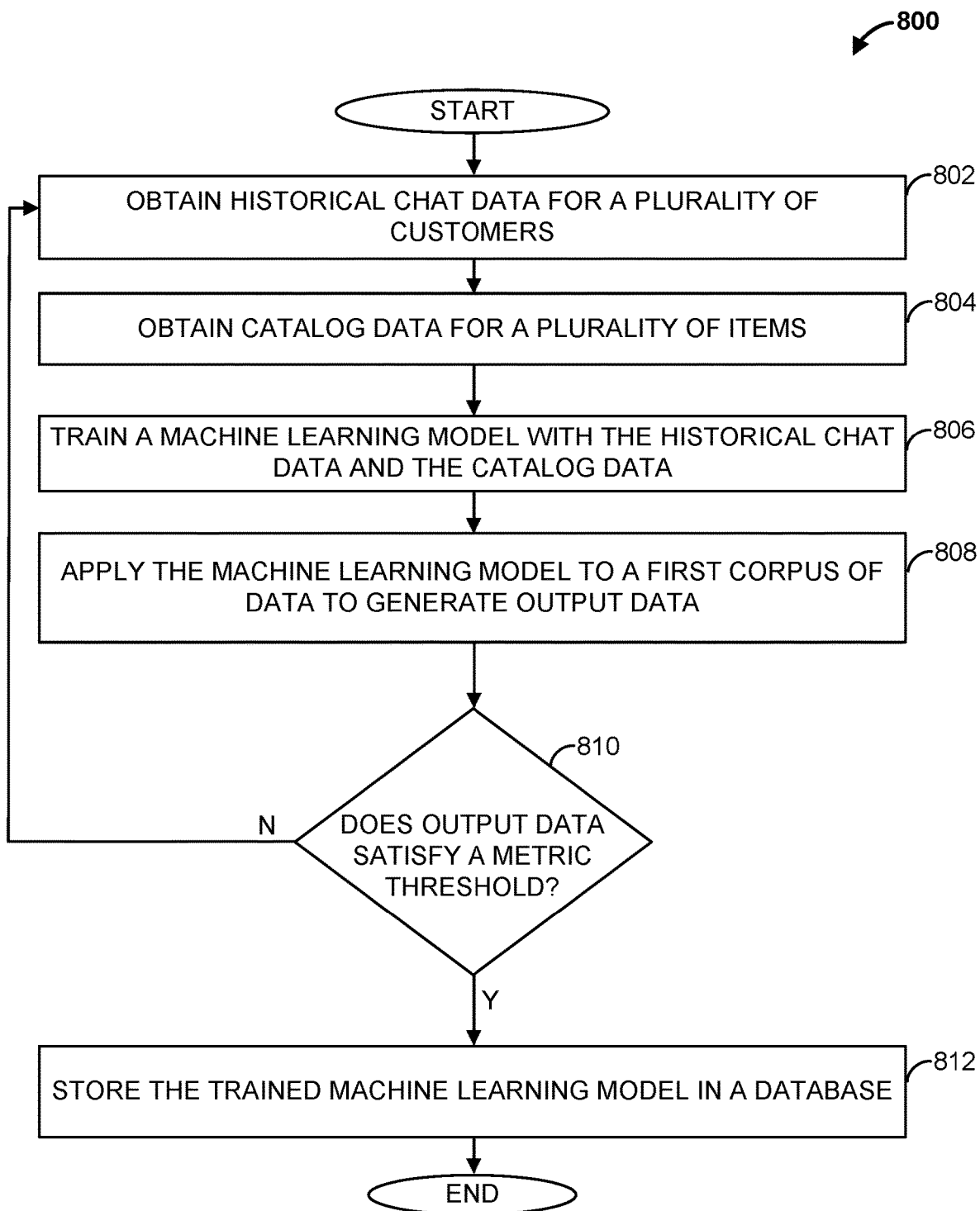
FIG. 8 is a flowchart of another example method that can be carried out by the natural language understanding system of FIG. 1 in accordance with some embodiments.

FIG. 8 is a flowchart of an example method 800 that can be carried out by the natural language understanding system 100 of FIG. 1. Beginning at step 802, historical chat data (e.g., command data 302) is obtained for a plurality of customers. At step 804, catalog data (e.g., catalog data 370) is obtained for a plurality of items. The catalog data may include, for example, titles and descriptions of the plurality of items. At step 806, a machine learning model is trained with the historical chat data and the catalog data. For example, the machine learning model may be either a two layer, or four layer, DistilBERT model characterized by NLP model data 385.

Proceeding to step 808, the machine learning model is applied to a first corpus of data to generate output data. The first corpus of data may be, for example, out of time corpus data. At step 810, a determination is made as to whether the output data satisfies a metric threshold. For example, the metric may be a threshold level of, for example, a threshold level of an F-1 score, a threshold level of an Area-Under-Curve (AUC) score, or any other measurable metric threshold. If the metric threshold is not satisfied, the method proceeds back to step 802, where further data is obtained for further training of the machine learning model.

If, however, at step 810 the metric threshold is satisfied, the method proceeds to step 812, where the trained machine learning model is stored in a database. For example, NLP computing device 102 may store the trained machine learning model in database 116. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a database; and
a computing device communicatively coupled to the database and configured to:
receive input data comprising a plurality of characters;
apply a Bidirectional Encoder Representation from Transformers (BERT) model to the input data to generate first output embeddings, wherein the computing device is configured to train the BERT model based on catalog data identifying one or more attributes of a plurality of items and chat session data;
apply a dependency embedding generation model to the input data to generate second output embeddings, wherein the dependency embedding generation model comprises a syntactic dependency embedding model configured to generate syntactic dependencies based on the input data, a transformer encoder comprising a single layer transformer block configured to generate encoded data from the syntactic dependencies, and a linear network configured to generate the second output embeddings based on the encoded data, and wherein the dependency embedding generation model is applied in parallel with the BERT model;
generate concatenated embeddings by stepwise concatenation of the first output embeddings and the second output embeddings;
determine, based on applying a classifier model to the concatenated embeddings, output values; and
store the output values in the database.

2. The system of claim 1, wherein the output values characterize at least one entity and an intent of the plurality of characters.

3. The system of claim 1, wherein the computing device is further configured to tokenize the input data into a plurality of tokens, wherein the BERT model is applied to the tokenized input data.

4. The system of claim 3, wherein the BERT model is configured to:
generate a sequence output for each of the one or more tokens and a pooled output;
apply a first linear layer to the sequence output to generate the first output embedding for each of the one or more tokens; and
apply a second linear layer to the pooled output to generate an intent embedding.

5. The system of claim 1, wherein the input data is received in a request from a second computing device, and wherein the computing device is further configured to generate a response to the request based on the output values.

6. The system of claim 1, wherein the BERT model includes a softmax function.

7. The system of claim 1, wherein the dependency embedding generation model comprises a two-layered neural network configured to receive a current intent.

8. A method comprising:
receiving input data comprising a plurality of characters;
training a Bidirectional Encoder Representation from Transformers (BERT) model based on catalog data identifying one or more attributes of a plurality of items and chat session data;
applying the BERT model to the input data to generate first output embeddings;
applying a dependency embedding generation model to the input data to generate second output embeddings, wherein the dependency embedding generation model comprises a syntactic dependency embedding model configured to generate syntactic dependencies based on the input data, a transformer encoder comprising a single layer transformer block configured to generate encoded data from the syntactic dependencies, and a linear network configured to generate the second output embeddings based on the encoded data, and wherein the dependency embedding generation model is applied in parallel with the BERT model;
generating concatenated embeddings by stepwise concatenation of the first output embeddings and the second output embeddings;
determining, based on applying a classifier model to the concatenated embeddings, output values; and
storing the output values in a database.

9. The method of claim 8, wherein the output values characterize at least one entity and an intent of the plurality of characters.

10. The method of claim 8, further comprising tokenizing the input data into a plurality of tokens, wherein the BERT model is applied to the tokenized input data.

11. The method of claim 10, wherein applying the BERT model comprises:
generating a sequence output for each of the plurality of tokens and a pooled output;
applying a first linear layer to the sequence output to generate the first output embeddings; and
applying a second linear layer to the pooled output to generate an intent embedding.

12. The method of claim 8, wherein the BERT model includes a softmax function.

13. The method of claim 8, wherein the dependency embedding generation model comprises a two-layered neural network configured to receive a current intent.

14. A non-transitory computer readable medium having instructions stored thereon, wherein the instructions, when executed by at least one processor, cause a device to perform operations comprising:
receiving input data comprising a plurality of characters;
training a Bidirectional Encoder Representation from Transformers (BERT) model based on catalog data identifying one or more attributes of a plurality of items and chat session data;
applying the BERT model to the input data to generate first output embeddings;
applying a dependency embedding generation model to the input data to generate second output embeddings, wherein the dependency embedding generation model comprises a syntactic dependency embedding model configured to generate syntactic dependencies based on the input data, a transformer encoder comprising a single layer transformer block configured to generate encoded data from the syntactic dependencies, and a linear network configured to generate the second output embeddings based on the encoded data, and wherein the dependency embedding generation model is applied in parallel with the BERT model;
generate concatenated embeddings by stepwise concatenation of the first output embeddings and the second output embeddings;
determining, based on applying a classifier model to the concatenated embeddings, output values; and
storing the output values in a database.

15. The non-transitory computer readable medium of claim 14, further comprising instructions stored thereon that, when executed by the at least one processor, further cause the device to perform operations comprising tokenizing the input data into a plurality of tokens, wherein the BERT model is applied to the tokenized input data.

16. The non-transitory computer readable medium of claim 15, wherein applying the BERT model comprises:
generating a sequence output for each of the one or more tokens and a pooled output;
applying a first linear layer to the sequence output to generate the first output embedding for each of the one or more tokens; and
applying a second linear layer to the pooled output to generate an intent embedding.

17. The non-transitory computer readable medium of claim 14, wherein the BERT model includes a softmax function.

18. The non-transitory computer readable medium of claim 14, wherein the dependency embedding generation model comprises a two-layered neural network configured to receive a current intent.

* * * * *